(12) United States Patent
Edge

(10) Patent No.: US 9,094,810 B2
(45) Date of Patent: Jul. 28, 2015

(54) TRANSFER AND MODIFICATION OF LOCATION RELATED DATA DURING AN ONGOING LOCATION SESSION

(75) Inventor: Stephen William Edge, Escondido, CA (US)

(73) Assignee: Qualcomm Incorporated, San Diego, CA (US)

( * ) Notice: Subject to any disclaimer, the term of this patent is extended or adjusted under 35 U.S.C. 154(b) by 227 days.

(21) Appl. No.: 13/197,705

(22) Filed: Aug. 3, 2011

(65) Prior Publication Data

US 2012/0196615 A1 Aug. 2, 2012

Related U.S. Application Data

(60) Provisional application No. 61/371,516, filed on Aug. 6, 2010, provisional application No. 61/375,009, filed on Aug. 18, 2010.

(51) Int. Cl.
*H04W 4/02* (2009.01)
*H04W 4/20* (2009.01)
(Continued)

(52) U.S. Cl.
CPC .............. *H04W 4/20* (2013.01); *G01S 5/0009* (2013.01); *G01S 5/0036* (2013.01); *G01S 5/0054* (2013.01); *G01S 19/10* (2013.01); *H04W 4/02* (2013.01); *H04W 4/025* (2013.01)

(58) Field of Classification Search
CPC ...... H04W 4/021; H04W 4/025; H04W 48/08
USPC .......................... 455/456.1, 456.2, 456.3, 436
See application file for complete search history.

(56) References Cited

U.S. PATENT DOCUMENTS

| 7,082,311 | B2 * | 7/2006 | Hefner et al. | 455/456.1 |
| 8,023,958 | B2 * | 9/2011 | Wang et al. | 455/456.1 |
| 8,160,582 | B2 * | 4/2012 | Han et al. | 455/433 |

(Continued)

FOREIGN PATENT DOCUMENTS

| CN | 101325801 A | 12/2008 |
| WO | WO2006111822 A2 | 10/2006 |

(Continued)

OTHER PUBLICATIONS

"3rd Generation Partnership Project; Technical Specification Group Radio Access Network; Evolved Universal Terrestrial Radio Access (E-UTRA); LTE Positioning Protocol (LPP) (Release 9)", 3GPP Standard; 3GPP TS 36.355, 3rd Generation Partnership Project (3GPP), Mobile Competence Centre; 650, Route Des Lucioles; F-06921 Sophia-Anti Polis Cedex; France, No. V9.2.1, Jun. 22, 2010, pp. 1-112, XP050441988, (retrieved on Jun. 22, 2010).

(Continued)

*Primary Examiner* — Qun Shen
(74) *Attorney, Agent, or Firm* — Kilpatrick Townsend & Stockton LLP

(57) ABSTRACT

Techniques are disclosed for enabling wireless communication with the capability of modifying assistance data and/or location information. A first transaction is used to define location related data for transferring between a location server and a mobile device. A second transaction is used to transfer the location related data between the location server and the mobile device. A third transaction is used to modify the location related data for transferring between the location server and the mobile device.

19 Claims, 11 Drawing Sheets

(51) Int. Cl.
*G01S 5/00* (2006.01)
*G01S 19/10* (2010.01)

(56) References Cited

U.S. PATENT DOCUMENTS

| | | |
|---|---|---|
| 2004/0138807 A1* | 7/2004 | Jha et al. ................. 701/200 |
| 2005/0282562 A1* | 12/2005 | Lee et al. ................. 455/458 |
| 2007/0287474 A1* | 12/2007 | Jenkins et al. ............ 455/456.2 |
| 2008/0125971 A1 | 5/2008 | van Diggelen et al. |
| 2008/0146261 A1* | 6/2008 | Bae ....................... 455/466 |
| 2009/0098857 A1* | 4/2009 | De Atley ................. 455/411 |
| 2009/0121927 A1 | 5/2009 | Moshfeghi |
| 2009/0238112 A1* | 9/2009 | Hong et al. .............. 370/328 |
| 2009/0325611 A1 | 12/2009 | Halivaara et al. |
| 2010/0013702 A1 | 1/2010 | Lin et al. |
| 2010/0090888 A1 | 4/2010 | Kangas |
| 2011/0131197 A1* | 6/2011 | Nielsen et al. ........... 707/713 |
| 2011/0137796 A1* | 6/2011 | Tullis ..................... 705/44 |
| 2011/0201356 A1* | 8/2011 | George ................... 455/456.2 |

FOREIGN PATENT DOCUMENTS

| | | | |
|---|---|---|---|
| WO | WO 2008135331 A2 * | 11/2008 | ............ H04L 29/08 |
| WO | WO2008135331 A2 | 11/2008 | |
| WO | WO-2012019057 A1 | 2/2012 | |

OTHER PUBLICATIONS

3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 9), 3GPP Standard; 3GPP TS 36.305, 3rd Generation Partnership Project (3GPP), Mobile Competence Centre; 650, Route Des Lucioles; F-06921 Sophia-Antipolis Cedex; France, No. V9.3.0, Jun. 21, 2010, pp. 1-52, XP050441977, (retrieved on Jun. 21, 2010).

International Search Report and Written Opinion—PCT/US2011/046668, ISA/EPO—Nov. 2, 2011.

* cited by examiner

TRANSFER AND MODIFICATION OF LOCATION RELATED DATA DURING AN ONGOING LOCATION SESSION

CROSS-REFERENCE TO RELATED APPLICATION

This application claims the benefit under 35 U.S.C. §119 (e) to U.S. Provisional Patent Application No. 61/371,516 entitled "Periodic Assistance Data and Location Information with Modify," filed on Aug. 6, 2010, and U.S. Provisional Patent Application No. 61/375,009 entitled "Periodic Assistance Data and Location Information with Modify," filed on Aug. 18, 2010, the disclosures of which are expressly incorporated by reference herein in their entireties.

BACKGROUND

1. Field

Aspects of the present disclosure relate, in general, to position location and, more particularly, to modifying location related data during an ongoing data transfer session.

2. Background

It may be beneficial to obtain the location of a mobile device such as a wireless phone, laptop, tablet, identity tag etc., at one or more times and to provide the location to a client application or device for the purpose of supporting a service or function. Examples of services and functions include providing navigation instructions to the user of the mobile device; tracking and/or recording the location of some valuable asset; and enabling the mobile device to obtain its own location.

To support location of mobile devices that have the capability to access wireless networks such as Global System for Mobile Communications (GSM), Code Division Multiple Access (CDMA), Wideband CDMA (WCDMA), Long Term Evolution (LTE) and WiFi and/or fixed access networks such as packet cable and DSL, a number of position methods and associated positioning protocols have been developed that rely on communication between the mobile device and a location server supported by one or more intervening fixed and/or wireless networks. One such positioning protocol developed by the $3^{rd}$ Generation Partnership Project (3GPP) in 3GPP Technical Specification (TS) 36.355 which is publicly available is known as the LTE Positioning Protocol (LPP) and is intended to locate mobile devices that are currently accessing an LTE network. An extension to this protocol known as LPP Extensions (LPPe) is being developed by the Open Mobile Alliance (OMA) to locate mobile devices that are currently accessing an LTE network or certain other kinds of network such as GSM, WCDMA, WiFi or fixed access. The relationship of LPPe to LPP is that each LPP message is allowed to optionally include an embedded LPPe message. An LPPe message not associated with an LPP message is not allowed. Since an LPPe message must be embedded inside an LPP message, procedures associated with LPPe messages must be associated with procedures for LPP messages which means that LPPe procedures can be the same as or extend LPP procedures but cannot conflict with LPP procedures which places constraints on what LPPe procedures can support.

The LPP, LPPe, and certain other positioning protocols support location by having the capability to transfer assistance data from the location server to the mobile device that is being located to better enable the mobile device to make measurements of suitable signals (e.g., signals from Global Positioning System (GPS) or Global Navigation Satellite System (GNSS) satellites, signals from wireless network base stations) and, in some cases, to determine its own location from these measurements. The protocols also have the capability to allow the location server to request and later receive particular signal measurements from the mobile device to enable the location server to calculate the location of the mobile device.

When the location of a mobile device is needed multiple times over a period of time, certain types of location related data, such as location assistance data and location measurement data may be sent periodically or when particular trigger conditions occur at a the mobile device or location server. In the case of LPP and LPPe, the assistance data will be related to a particular position method(s) defined in LPP and/or LPPe and may be delivered at periodic intervals. These intervals may be fixed and defined in the LPP or LPPe request for assistance data sent by a mobile target device to a location server or may be defined as being triggered by the occurrence of a particular event(s). Similarly, location information may be periodically delivered from a target device to a location server. Location information may contain information pertaining to location measurements and/or a location estimate for a target device. The periodic intervals of delivering the location information may be fixed or may be defined as being triggered by the occurrence of a particular event or events at the target device.

After the delivery of assistance data or location information has started, the receiver may not be able to modify the type of information being transferred or the conditions for periodically sending it without aborting and restarting the assistance data or location information transfer session. For example, a target device can send a request to a location server specifying particular assistance data that the server should transfer to the target either once only or periodically. But with existing positioning protocols such as LPP, the target cannot later send another request to the server to modify the type of assistance data to be transferred or the periodic intervals or trigger conditions for sending it. Similarly, a location server can send a request to a target device specifying particular location information the target should transfer to the server either once only or periodically. But with existing positioning protocols such as LPP, the server cannot later send another request to the target to modify the type of location information to be transferred or the periodicity or trigger conditions for sending it.

One procedure that would allow location related data (either assistance data or location information) to be modified would be to stop or abort an ongoing transfer and then start a new transfer that defines a new type of assistance data or new type of location information and new conditions for periodically sending the information. However, information and resources associated with the initial transfer may then be released when the initial transfer was stopped. Lost or missing information may need to be reacquired or re-obtained which could take a significant time period as well as requiring extra use of processing and signaling resources. More significantly, it may not be possible to re-obtain some information associated with the previous transfer. For example, in may not be possible to re-obtain any measurements related to previous locations of the mobile device or usefully provide assistance data to help enable previous location estimates for the mobile device. The consequences may include delay in effectively changing the periodic assistance data or location information and some loss of assistance data or location information.

Although modification of an ongoing assistance data or location information transfer procedure may confer benefits in terms of reducing delay and resource consumption and avoiding the unrecoverable loss of some assistance data or location information in comparison to a procedure that stop or aborts and later restarts the transfer, there may be problems in modifying the transfer. For example, if the receiver requests modification of the transfer, the receiver needs to be aware subsequently that the modification will be supported by the sender. Also the method for performing the modification may need to comply with preexisting rules associated with the positioning protocol being used to avoid either end aborting the transfer due to a perceived protocol error. Further, it may be beneficial to allow either the sender or the receiver to instigate the modification (e.g., the sender may need to be able to modify the data being transferred if the data available to it changes). Protocol support for the modification should thus ideally support these capabilities.

In the case of LPP, the protocol supports the requesting and subsequent transfer of either assistance data (from the location server to the target device) or location information such as location measurements (from the target device to the location server) but the protocol does not contain any means to modify a transfer once in progress. Although such a capability could be added to LPP, the resulting extended protocol might not be compatible with the previous version of LPP, meaning a device supporting the earlier version could not always interwork correctly with a device supporting the later version. In addition, if such a capability was added to LPPe (which extends LPP but does not modify LPP itself) it would have to be supported by existing LPP procedures which, as just mentioned, do not explicitly enable modification of an ongoing transfer. Therefore, the addition of a modification capability for assistance data or location information transfer becomes a problem to be solved.

SUMMARY

In one aspect, a method of wireless communication is disclosed. The method includes defining location related data for transferring between a location server and a mobile device using a first transaction. The method also includes transferring the location related data between the location server and the mobile device using a second transaction.

Another aspect discloses wireless communication having a memory and at least one processor coupled to the memory. The processor(s) is configured to define location related data for transferring between a location server and a mobile device using a first transaction. The processor(s) is also configured to transfer the location related data between the location server and the mobile device using a second transaction.

In another aspect, a computer program product for wireless communication in a wireless network is disclosed. The computer-readable medium has non-transitory program code recorded thereon which, when executed by the processor(s), causes the processor(s) to perform operations of defining location related data for transferring between a location server and a mobile device using a first transaction. The program code also causes the processor(s) to transfer the location related data between the location server and the mobile device using a second transaction.

Another aspect discloses an apparatus including means for defining location related data for transferring between a location server and a mobile device using a first transaction. Also included is means for transferring the location related data between the location server and the mobile device using a second transaction.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The present disclosure relates to the support of location services in which the location of a mobile target device is needed at periodic intervals by the device itself or by some client or application external to the target device.

One aspect of the present disclosure allows for the modification of an ongoing transfer of assistance data or location information. In particular, the initial transfer of assistance data or location information may be modified by the target device or location server without stopping or aborting the transfer session to ensure that resources and information needed for the new transfer are not released. In addition, the modification can be agreed or changed by the other end and confirmed back to the end requesting the change and the modification can comply with existing rules regarding operation of the positioning protocol. In supporting the modification in LPPe, existing LPP procedures to request and obtain either assistance data (from a location server) or location information (from a target device) are retained. LPP procedures may also be referred to as LPP transactions and both terms are used synonymously hereafter. The LPP procedures are also extended so that a control procedure or transaction (A) is used to initially request assistance data or location information while a second data procedure or data transaction (B) is used to transfer the assistance data or location information. A third and a fourth control procedure, separate from the previous two, are also added to enable a request for modification of an ongoing transfer of assistance data or location information to be sent by either the receiver for the transfer (C) or the sender for the transfer (D). Each of these four procedures is compliant to the transfer procedure for assistance data or location information defined in 3GPP TS 36.355 for LPP. In particular procedures (A), (C) and (D) comprise a request from the initiating end followed by a response from the recipient carrying an end of transaction indication indicating the end of the procedure. Procedure (B) comprises a sequence of LPP/LPPe messages carrying assistance data or location information with the final message (carrying the last portion of assistance data or location information) indicating an end of transaction and thus end of the procedure. These procedures are described in greater detail further on here.

Figure 1:
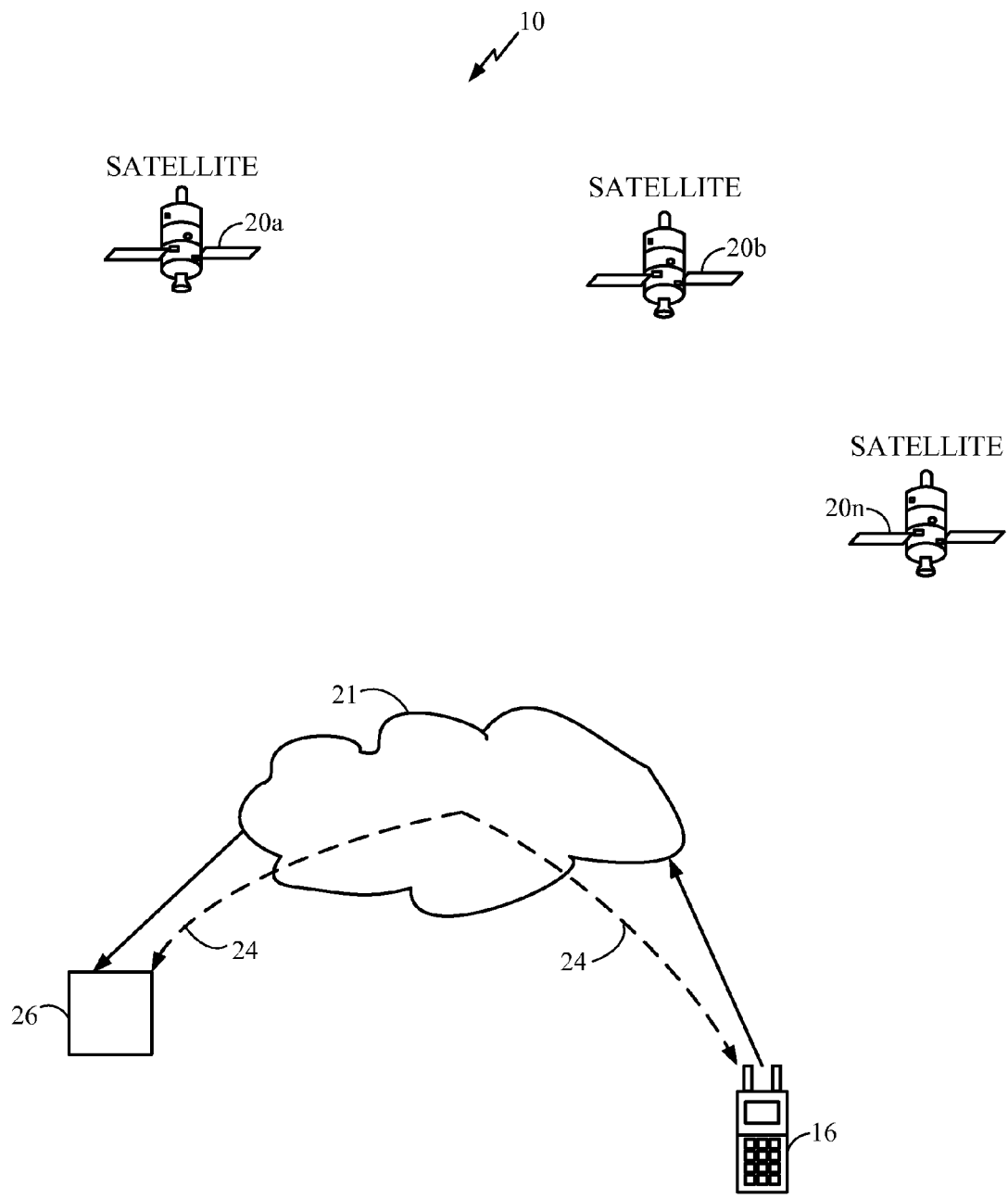
FIG. 1 is a block diagram conceptually illustrating a system in which location related data may be modified during an ongoing data transfer session.

FIG. 1 illustrates a system 10 providing for the modification of location related data during an ongoing data transfer session. FIG. 1 includes a mobile device 16 and a location server 26. The mobile device 16 may be a wireless terminal, wireline terminal, cell phone, smartphone, laptop, tablet, etc., and may be referred to as a user equipment (UE), mobile station (MS), mobile target device, target device or target. The location server 26 may be a 3GPP Serving Mobile Location Center (SMLC), Standalone SMLC (SAS) or a $3^{rd}$ Generation Partnership Project 2 (3GPP2) Position Determining Entity (PDE) or an OMA SUPL Location Platform (SLP) supporting the OMA Secure User Plane Location (SUPL) solution or some other location server.

The mobile device 16 includes access to a network 21. The network 21 may be a wireless network, fixed network, or a combination of wireless and/or fixed networks. The location server 26 is also connected with the network 21. Coupled with the location server 26 would be some location client (not shown in FIG. 1) that might be requesting and receiving the location of the target device. In reality, the location server 26 may reside inside the network 21, be external and have communication access to the network 21 or may be inside or attached to another network (not shown) that is reachable via the network 21. GPS or GNSS satellites 20a-20n may be detectable by the mobile device 16.

Position location signals may be transmitted from one or more satellites 20a-20n. The position location signals transmitted from one or more satellites 20a-n may be received by network 21. The network 21 may forward the satellite information to a location server 26, which may transmit part or all of the satellite information as assistance data to any number of receivers, transceivers, servers, and/or terminals, including the mobile device 16 whose user may be seeking to establish a position location using satellite position system (SPS) technology included in the mobile device 16. Location related data, such as assistance data and location measurement data, may also be transmitted between the mobile device 16 and the location server 26. Transfer of assistance data (e.g. satellite information) and/or location information between the mobile device 16 and the location server 26 may employ a communication capability 24 (e.g. a connection or session) through the network 21 (and through additional networks if the location server 26 is connected to another network and not to network 21). The communication capability 24 may make use of transport protocols like the Transmission Control Protocol (TCP) and Internet Protocol (IP) or protocols associated with and defined for the particular type (e.g. GSM, CDMA, WCDMA, LTE) of the network 21 and may employ a positioning protocol such as LPP and LPPe supported by the location server 26 and the mobile device 16 but not necessarily by the network 21.

Figure 2A:
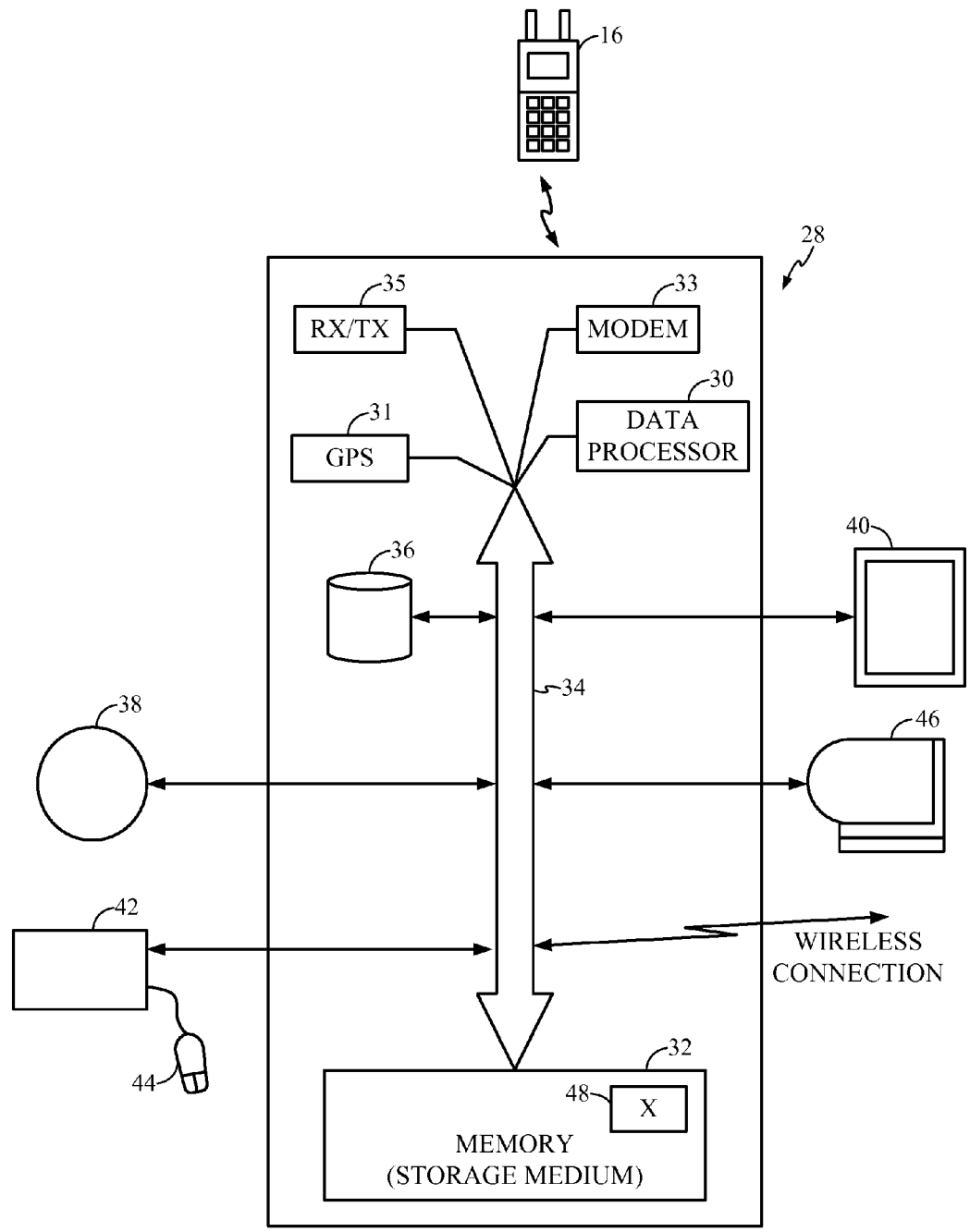
FIGS. 2A and 2B are diagrams conceptually illustrating a data processing system that supports the modification of location related data during an ongoing data transfer session.

FIG. 2A illustrates, by cross-reference with FIG. 1, that the mobile device 16 includes at least one computer processing system 28. As shown, the computer processing system 28 is operatively connected to the mobile device 16. In one aspect, the computer processing system 28 is housed in the mobile device 16. The computer processing system 28 is adapted to receive, store, process, and execute instructions at least in connection with location position data.

The computer processing system 28 of the mobile device 16 is illustrated in the block diagram of FIG. 2A. As shown, the computer processing system 28 may include a variety of components to enable the mobile device 16 to receive, process, store, and execute instructions in connection with data and information about position location data, including position signals (FIG. 1), and base station position location signal (FIG. 1) that includes position location data. The components may include a data processor 30, a position location receiver (e.g., a GPS receiver) 31, a storage medium 32, a wireless modem 33, and a cellular transceiver 35, all coupled by a bus 34. The storage medium 32 is a machine- or computer-readable medium and may include but is not limited to volatile memories such as DRAM, and SRAM, as well as non-volatile memories such as ROM, FLASH, EPROM, EEPROM, and bubble memory.

Also capable of being connected to the bus are optional secondary storage 36, external storage 38, output devices such as a monitor 40 that may be included with the mobile device 16 and, in optional configurations, an input device such as a keyboard 42, a mouse 44, and a printer 46. The secondary storage 36 may include machine-readable media such as, but not limited to, a hard disk drive, a magnetic drum, and a bubble memory. The external storage 38 may include machine-readable media such as a floppy disk, a removable hard drive, a magnetic tape, CD-ROM, removable memory cards, and even other computers connected via a communications line. The distinction between the secondary storage 36 and external storage 38 is primarily for convenience in describing the use of machine readable memory. As such, a person skilled in the art will appreciate that there is substantial functional overlap between and among the components. Computer software and user programs can be stored in the storage medium 32 and the external storage 38. Executable versions of computer software can be read from the storage medium 32 or another non-volatile storage medium, loaded for execution directly into volatile storage medium, executed directly out of non-volatile storage medium, or stored on the secondary storage prior to loading into volatile storage medium for execution.

The computer processing system 28 illustrated in FIG. 2A of the mobile device 16 includes a set of computer instructions (in this document, "instructions") for implementing the methods of the location related data transfer system 10 described in this document. The instructions 48 are illustrated in FIG. 2A diagrammatically solely as an aid in understanding the method of the location related data transfer system 10 described in this document. The instructions may be stored in various internal memory or may be implemented in hardware. The instructions may also be included in a computer processing system of a computer located external to the mobile device 16, for example, on a secured intranet, on the Internet, or at a base station, from which they may be transmitted to mobile device 16. Data associated with the instructions may be received, stored, processed and transmitted to mobile devices, but only a single mobile device 16 is illustrated for clarity. Data associated with the instructions also may be received, stored, processed and transmitted to/from one or more base stations across a wireless communications system. Alternately, data associated with the instructions also may be received, stored, processed, and transmitted to/from a computer server connected to the wireless network.

Figure 2B:
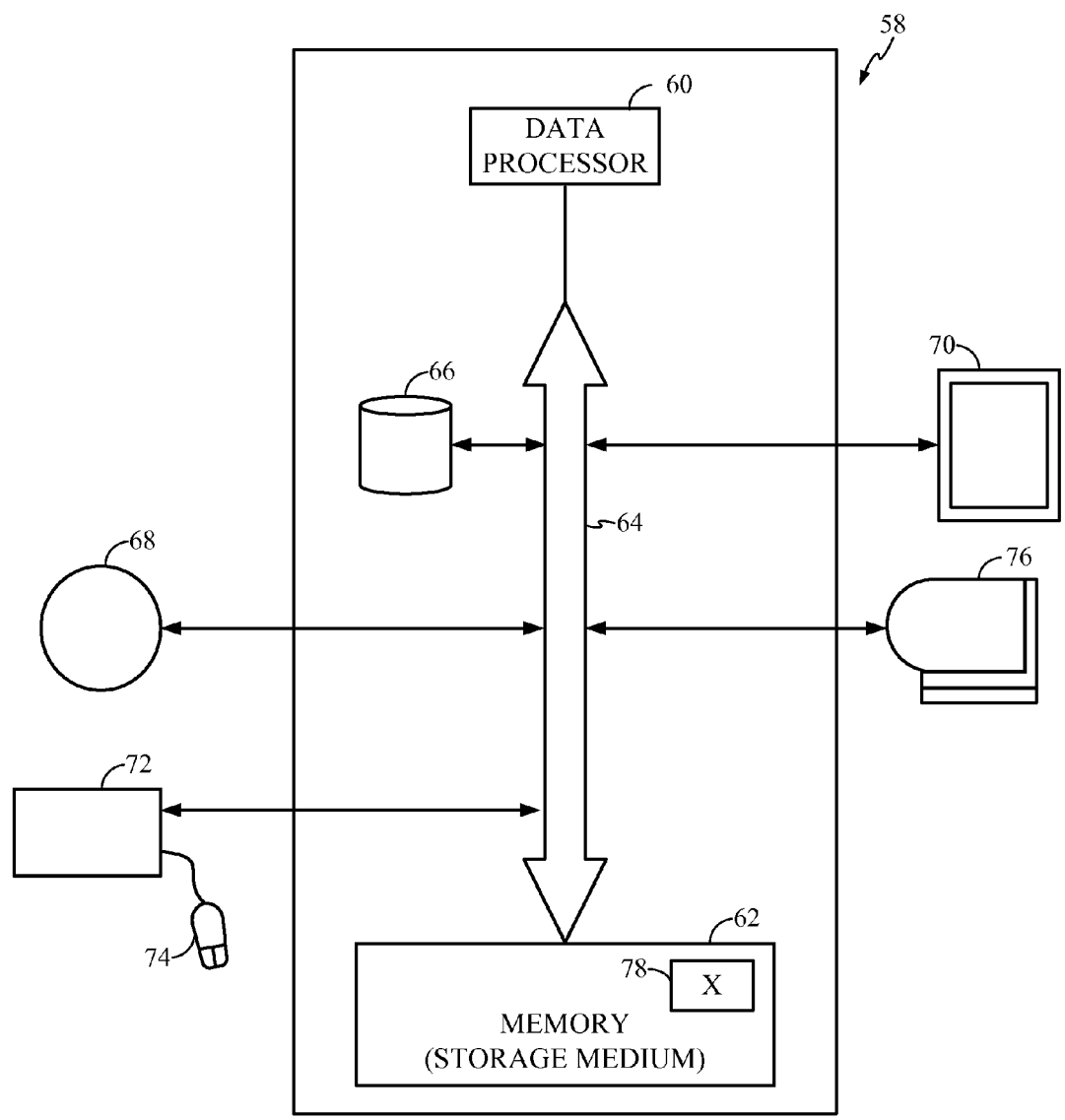

FIG. 2B illustrates, by cross-reference with FIG. 1, that the location server 26 includes at least one computer processing system 58. In one aspect, the computer processing system 58 is housed in the location server 26. The computer processing system 58 is adapted to receive, store, process, and execute instructions at least in connection with location position data.

The computer processing system 58 of the location server 26 is illustrated in the block diagram of FIG. 2B. As shown, the computer processing system 58 may include a variety of components to enable the location server 26 to receive, process, store, and execute instructions in connection with data and information about position location data, including position signals, and base station position location signals that includes position location data. The components may include a data processor 60 and a storage medium 62, coupled by a bus 64. The storage medium 62 is a machine- or computer-readable medium and may include but is not limited to volatile memories such as DRAM, and SRAM, as well as non-volatile memories such as ROM, FLASH, EPROM, EEPROM, and bubble memory.

Also capable of being coupled to the bus are optional secondary storage 66, external storage 68, output devices such as a monitor 70 that may be included with the location server 26 and, in optional configurations, an input device such as a keyboard 72, a mouse 74, and a printer 76. The secondary storage 66 may include machine-readable media such as, but not limited to, a hard disk drive, a magnetic drum, and a bubble memory. The external storage 68 may include machine-readable media such as a floppy disk, a removable hard drive, a magnetic tape, CD-ROM, removable memory cards, and even other computers connected via a communications line. The distinction between the optional secondary storage 66 and the external storage 68 is primarily for convenience in describing the use of machine readable memory. As such, a person skilled in the art will appreciate that there is substantial functional overlap between and among the components. Computer software and user programs can be stored in the storage medium 62 and external storage 68. Executable versions of computer software can be read from the storage medium 62 or other non-volatile storage medium, loaded for execution directly into volatile storage medium, executed directly out of non-volatile storage medium, or stored on the secondary storage prior to loading into volatile storage medium for execution.

The computer processing system 58 of the location server 26 includes a set of computer instructions (in this document, "instructions") for implementing the methods of the location related data transfer system 10 described in this document. The instructions 78 may be stored in various internal memory or may be implemented in hardware. The instructions may also be included in a computer processing system of a computer located external to the location server 26, for example, on a secured intranet, on the Internet, or at a base station, from which they may be transmitted to location server 26.

In one aspect, the system allowing for modification of location related data in an ongoing data transfer session between a location server and a mobile device is configured to extend the capabilities of LPP. For example, a LPP message may be configured to contain information and parameters for LPP as defined in 3GPP TS 36.355 and an additional embedded LPPe (LPP extension protocol) message that contains additional information and supports additional procedures. Information carried in an embedded LPPe message may be used to support transfer of assistance data and location information as for LPP according to defined procedures. These procedures may modify the periodic transfer of assistance data or location information carried by LPPe without stopping or aborting an earlier transfer. In another aspect, the procedures used by LPPe are compatible with the procedures already defined for LPP in 3GPP TS 36.355 and avoid protocol errors at the LPP level.

In one aspect, the LPPe procedure is defined to support the periodic transfer of location related data with the ability to later modify the transfer. Location related data may include assistance data and location measurement information. The procedure may include multiple instances of the unsolicited and/or solicited LPP assistance data transfer procedure or multiple instances of the unsolicited and/or solicited LPP location information transfer procedure with each instance of either procedure being as defined in TS 36.355 (e.g. the last message for each such instance would then contain an end of transaction indicator).

Figure 6A:
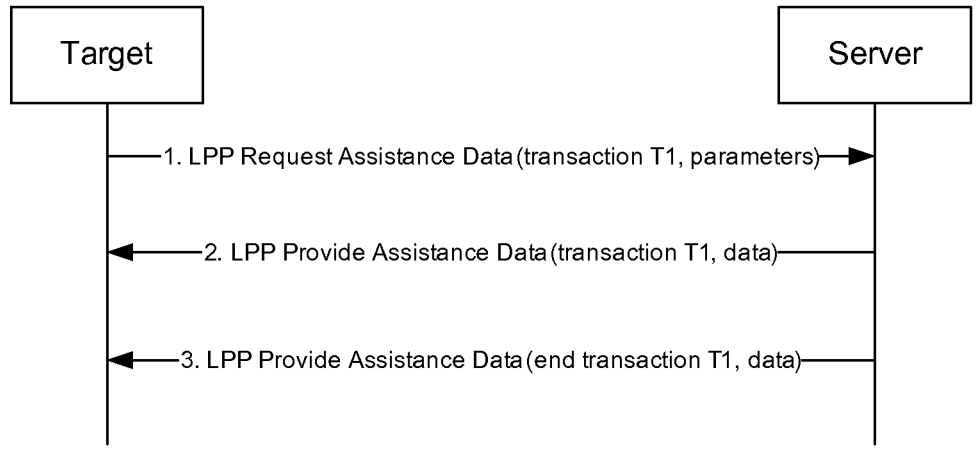
FIGS. 6A and 6B are call flow diagrams illustrating procedures to transfer assistance data from a location server to a target.

FIG. 6A illustrates a procedure to transfer assistance data from a location server (e.g., location server 26 in FIG. 1) to a target device (e.g., mobile device 16 in FIG. 1) as defined for LPP in 3GPP TS 36.355. Optionally in step 1, the target device sends an LPP request for assistance data to the location server. The LPP message in step 1 includes some transaction ID T1 and parameters defining the type of location assistance data requested.

In step 2, the location server 26 sends an LPP message to the target containing the assistance data requested in step 1 and the same transaction ID T1 used in step 1. If step 1 does not occur, the location server 26 can still send assistance data to the target device in step 2 but in this case as unsolicited assistance data. Furthermore, when assistance data is sent unsolicited, the location server may decide the content of the data itself or may base this on some previous request from the target device not shown in FIG. 6A. Step 2 may be repeated one or more times to send additional data at the same time or to send additional data at one or more subsequent times.

In step 3, the location server sends final assistance data and indicates the end of the procedure by including an end of transaction indication for the transaction T1. If only one set of assistance data is sent, step 2 can be skipped and only step 3 and optionally step 1 can occur.

Figure 6B:
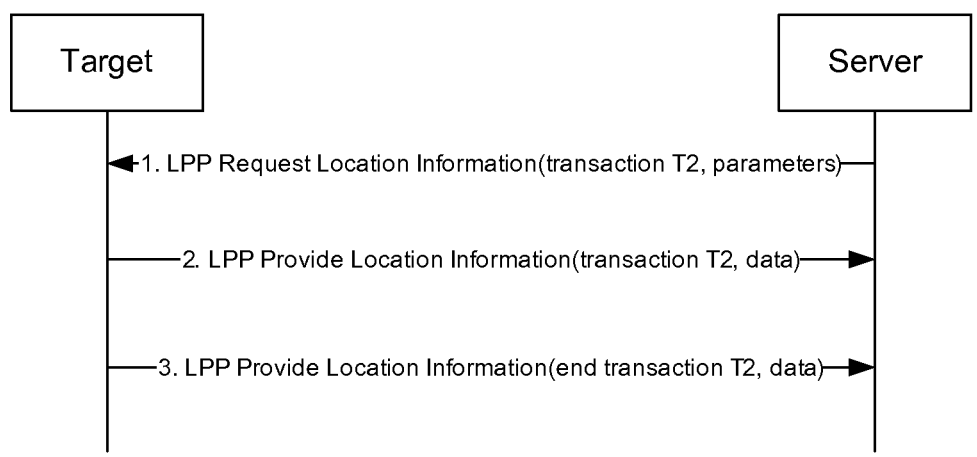

FIG. 6B illustrates a procedure to transfer location information from a target device (e.g., mobile device 16 in FIG. 1)

to a location server (e.g. location server 26 in FIG. 1) as defined for LPP in 3GPP TS 36.355. Optionally in step 1, the location server sends an LPP request for location information to the target device. The LPP message in step 1 includes some transaction ID T2 and parameters defining the type of location information requested.

In step 2, the target sends an LPP message to the location serve 26 containing the location information requested in step 1 and the same transaction ID T2 used in step 1. If step 1 did not occur, the target can still send location information to the location server 26 in step 2 but in this case as unsolicited location information. Furthermore, when location information is sent unsolicited, the target device may decide the content of the location information itself or may base this on some previous request from the location server 26 not shown in FIG. 6B. Step 2 may be repeated one or more times to send additional data at the same time or send additional data at one or more subsequent times.

In step 3, the target device sends final location information and indicates the end of the procedure by including an end of transaction indication for the transaction T2. If only one set of location information is sent, step 2 can be skipped and only step 3 and optionally step 1 can occur.

The LPP rules in 3GPP TS 36.355 require use of the same transaction ID in all messages of the same procedure as illustrated in FIGS. 6A and 6B and require the final message to carry an end of transaction indicator. The rules also allow one end to specify the data to be sent as in step 1 in FIGS. 6A and 6B but contain no provision for modifying the data once an initial request has been sent. Since LPPe messages are required to be carried inside LPP messages with LPPe procedures conforming to LPP procedures, there is no direct way to modify a location related data transfer by just extending a single LPP procedure of the type shown in FIGS. 6A and 6B. Instead, multiple LPP procedures can be used as disclosed herein.

One aspect provides a procedure to support the delivery of periodic or triggered assistance data from a server 302 (which may be the same as location server 26 in FIG. 1) to a target 301, such as a mobile device (which may be the same as mobile device 16 in FIG. 1). In this case, the server 302 would transfer previously agreed types of assistance data to the target 301 at pre-agreed times (e.g., at fixed periodic intervals) or when specific trigger conditions occur at server 302 (e.g., when new assistance data becomes available or when previously sent assistance data becomes invalid). During the delivery procedure, the target 301 may modify the type of assistance data being delivered and/or the periodic or triggering parameters that control when the assistance data will be sent.

Figure 3A:
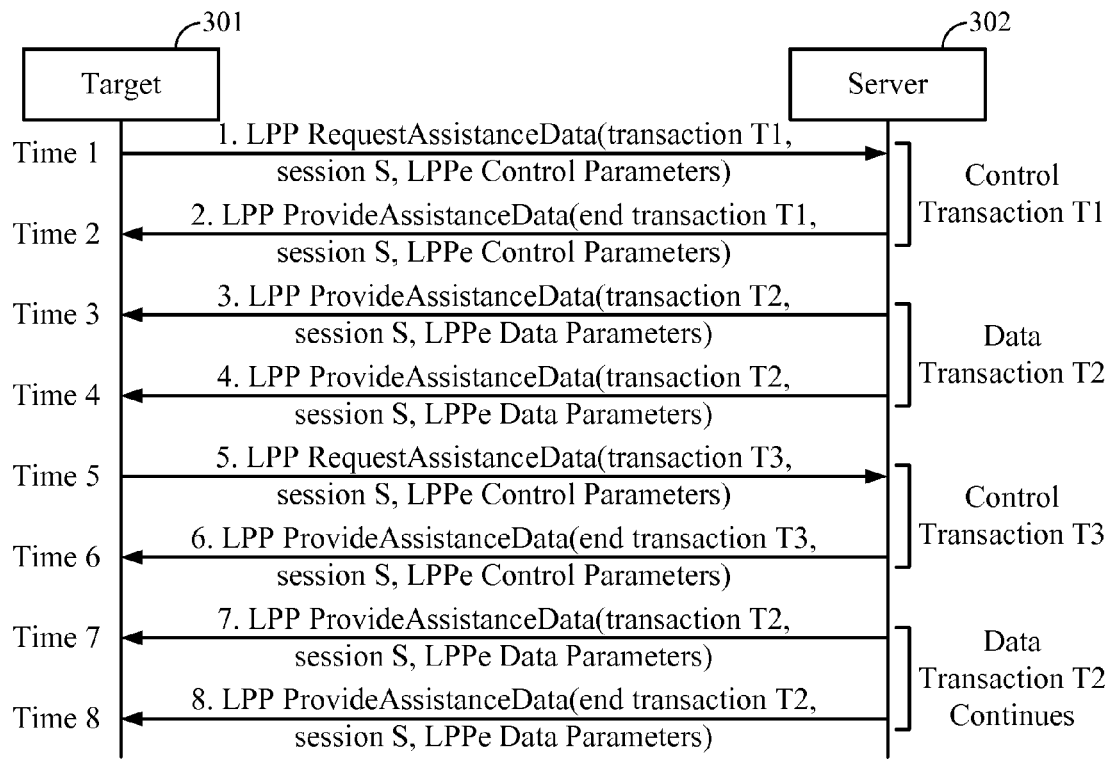
FIG. 3A is a call flow diagram illustrating an example assistance data transfer procedure allowing for modification of assistance data while the data transfer session is ongoing.

FIG. 3A illustrates a message flow diagram for an exemplary periodic and/or triggered assistance data transfer with target update. This procedure enables a target 301 to request a server 302 to send assistance data periodically at defined intervals or when specific triggering criteria are met. The procedure also allows the target 301 to modify the type of assistance data and/or the periodicity and triggering criteria while the data transfer session is ongoing.

At time 1, the target 301 sends an LPP RequestAssistanceData message to the server 302 using an available transaction ID T1. The message may contain a session ID S, which is different from any other LPPe session ID currently in use between the target 301 and server 302 for any other instance of the same type of procedure. The message may also contain LPPe control parameters identifying the type of assistance data being requested, the triggering or periodicity conditions for sending the data and either a duration or other specific condition(s) for ending the assistance data transfer. At time 2, the server 302 responds with an LPP ProvideAssistanceData message to the target 301. The message uses the transaction ID T1 from time 1 and indicates the end of this transaction. The message contains the session ID S and LPPe control parameters indicating whether the request sent at time 1 can be supported. If the request can be supported, the LPPe control parameters may modify the type of assistance data and the conditions for sending it. For example, the modification may include confirming or redefining the type of assistance data transferred, the triggering or periodicity parameters for transferring the data and/or the duration or other conditions for ending the assistance data transfer. The LPPe control parameters may also include further characteristics of the assistance data to be delivered. The message in step 2 ends the LPP procedure (also known as a transaction) started in step 1 and complies with the LPP rules in 3GPP TS 36.355 (e.g., corresponds to steps 1 and 3 in FIG. 6A). Since the procedure establishes what assistance data is to be transferred in subsequent steps but does not actually transfer any assistance data, it may be referred to as a control transaction or control procedure.

At time 3, when the first triggering or periodicity condition(s) occurs, the server 302 sends an unsolicited LPP ProvideAssistanceData message to the target 301 containing the session ID S and LPPe data parameters containing the assistance data confirmed or defined at times 2 or 1. The message uses an available transaction ID T2 that may be different from T1. The LPPe control parameters and LPPe data parameters applicable to this procedure are distinguishable from one another. The session ID S confirms to the target 301 that the assistance data corresponds to that agreed in steps 1 and 2.

At time 4, the server 302 may continue to send further LPP ProvideAssistanceData messages to the target 301 containing the assistance data confirmed or redefined at times 2 or 1 when each additional triggering or periodicity condition(s) occurs. If the duration or other conditions for ending the assistance data transfer occur, the last ProvideAssistanceData message transferred indicates the end of transaction T2 and the transactions occurring at times 5-8 are omitted. In this case the procedure (or transaction) ends according to the rules for LPP in 3GPP TS 36.355 (e.g., corresponds to steps 2 and 3 in FIG. 6A for unsolicited transfer of assistance data). In this case, since the procedure transfers assistance data but does not negotiate or modify its content, it may be referred to as data transaction or data procedure.

Before the delivery of assistance data has terminated, the target 301 may update the type of assistance data and/or the triggering and periodicity conditions and/or the duration or condition(s) for termination by sending an LPP RequestAssistanceData message to the server 302 at time 5, using an available transaction ID T3. The ID T3 is different from T2. The message contains the session ID S and LPPe control parameters identifying any new type of assistance data being requested, any new triggering or periodicity conditions for sending it and any new duration or specific conditions for ending the assistance data transfer. The control parameters may also indicate whether the previous assistance data delivery shall continue (default) or be aborted if the new request cannot be supported. Inclusion of the session ID S tells the server 302 that the new request relates to the assistance data transfer of steps 1 to 4. Use of a transaction ID T3 that is different from T2 avoids an LPP protocol violation because the request in step 5 is seen by both target 301 and server 302 as belonging to a different LPP procedure (different transaction) from that associated with steps 3 and 4. Had transaction ID T3 been the same as T2, there would be a protocol violation and server 302 might abort the transfer.

At time 6, the server 302 responds with an LPP ProvideAssistanceData message to the target 301. The message uses the transaction ID T3 and indicates the end of this transaction. The message contains LPPe control parameters indicating whether the modified request at time 5 can be supported. If the request can be supported, the control parameters may explicitly confirm or redefine any new type of assistance data, any new triggering or periodicity parameters, and any new duration or other condition(s) for ending the assistance data transfer. Further characteristics of the assistance data to be delivered may also be provided in the LPPe control parameters. If the request at time 5 cannot be supported, then, unless requested otherwise at time 5, the earlier request at time 1 shall continue via further repetitions of the transaction occurring at time 4 until the data transfer session ends normally or is modified by a repetition of the request occurring at time 5 or is aborted by the target 301. If requested otherwise at time 5, the earlier request (including transaction T2) is aborted at the server 302 without the sending of any further assistance data to the target 301. In either case, the transactions occurring at times 7 and 8 are then omitted. The procedure associated with steps 5 and 6 then ends (because an end of transaction indicator was included by the server 302 in step 6) and complies with LPP procedure rules in 3GPP TS 36.355 (e.g., corresponds to steps 1 and 3 in FIG. 6A). Since the procedure modifies the assistance data being transferred but does not actually transfer any assistance data, it may be referred to as a control transaction or control procedure.

At time 7, if the server 302 can support the request occurring at time 5, the server 302 ceases to support the request at time 1. Due to race conditions, one or more repetitions of the message occurring at time 4 may be perceived to occur by the target 301 following time 5 and prior to time 6. When the first updated triggering or periodicity condition(s) occurs following time 6, the server 302 sends an unsolicited LPP ProvideAssistanceData message to the target 301 containing the session ID S and LPPe data parameters containing the new assistance data confirmed or defined at times 6 or 5. The message continues to uses transaction ID T2 which avoids disturbing (e.g. violating) the LPP procedure for transfer of assistance data. Target 301 can determine when server 302 has changed the assistance data transfer according to when the LPP message in step 6 is received. Provided LPP messages are delivered to target 301 in the order sent by server 302 (which is a requirement for LPP in 3GPP TS 35.355), then all instances of step 4 will cease before step 6 occurs and step 7 will occur after step 6 has occurred. This avoids the need to include anything in the LPP message in step 7 to specifically indicate that changes to assistance data transfer have occurred which simplifies LPP and LPPe message content.

At time 8, the server 302 may continue to send additional LPP ProvideAssistanceData messages to the target 301 containing the session ID S and LPPe data parameters containing the new assistance data confirmed or redefined at times 6 or 5 when each additional triggering or periodicity condition(s) occurs. If the duration or other conditions for ending the assistance data transfer occur, the last LPP ProvideAssistanceData message transferred indicates the end of transaction T2. Before the end of the transaction, the target 301 may update the type of assistance data, triggering or periodicity conditions and/or duration or other conditions for terminating the transfer, and the transactions occurring at times 5 and 6 are repeated. The termination of the procedure in step 8 by including an end of transaction identifier follows LPP procedure rules (e.g., step 8 corresponds to step 3 in FIG. 6A). Moreover, the complete transfer of assistance data in steps 3, 4, 7 and 8 corresponds to a normal unsolicited LPP transfer of assistance data as shown in steps 2 and 3 of FIG. 6A). As these steps transfer assistance data but do not define or modify its content, they may be referred to as a data transaction or data procedure.

It may be seen from the above description, that the overall procedure in FIG. 3A is made of 3 separate smaller LPP procedures or transactions: a control transaction in steps 1 and 2 to define and agree the assistance data to be transferred, another control transaction in steps 5 and 6 to modify the assistance data to be transferred and a data transaction in steps 3, 4, 7 and 8 to transfer the assistance data. These smaller procedures (or transactions) follow LPP rules in 3GPP TS 36.355 thus making the overall composite procedures also compliant with LPP.

Figure 3B:
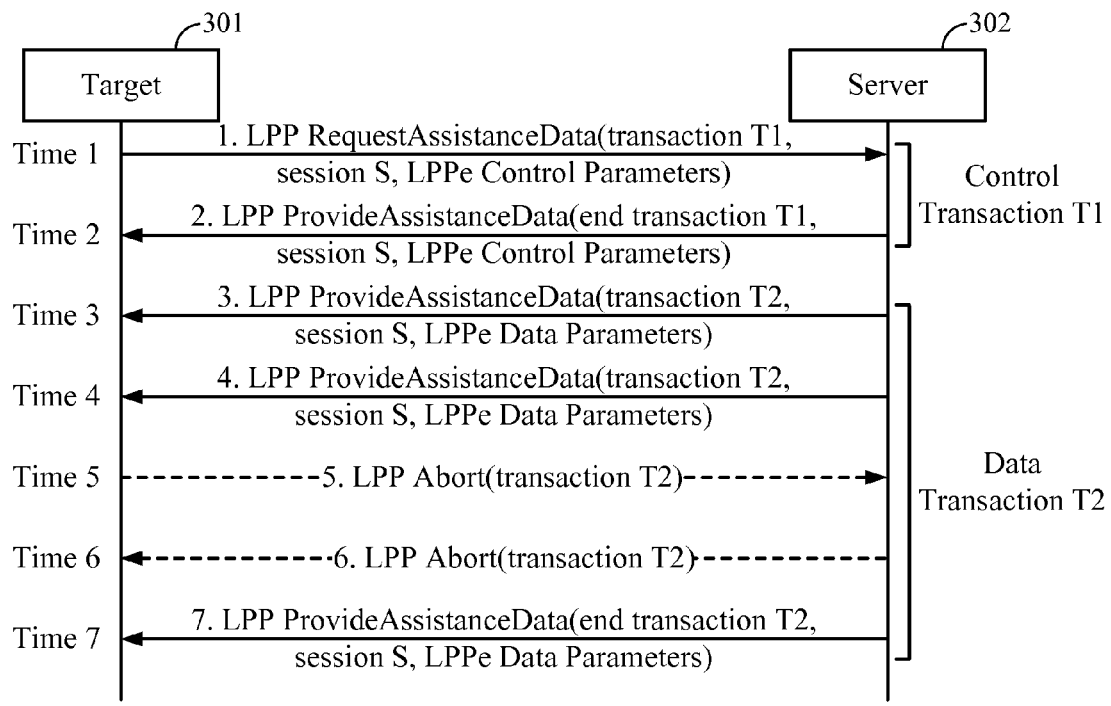
FIG. 3B is a call flow diagram illustrating example initiation and termination of the session illustrated in FIG. 3A.

FIG. 3B shows a message flow diagram illustrating how the assistance data transfer session of FIG. 3A may be initiated and terminated. At time 1, the target 301 sends an LPP RequestAssistanceData message to the server 302 using an available transaction ID T1. The message contains a session ID S that is different from any other LPPe session ID currently in use between the target 301 and server 302 for any other instance of the same type of procedure. The message contains an indication that the message is an initial request for a periodic/triggered assistance data transfer. The message also contains LPPe control parameters identifying the type of assistance data being requested, the triggering or periodicity conditions for sending the data, and either a duration or other specific condition(s) for ending the assistance data transfer.

At time 2, the server 302 responds with an LPP ProvideAssistanceData message to the target 301. The message uses the transaction ID T1 at time 1 and indicates the end of this transaction. The message contains the session ID S, an indication that the message is a response to an initial request, and LPPe control parameters. The LPPe control parameters indicate whether the request occurring at time 1 can be supported. If the request can be supported, the LPPe control parameters may confirm or redefine the type of assistance data, the triggering or periodicity parameters and the duration or other condition(s) for ending the assistance data transfer. Further characteristics of the assistance data to be delivered may also be provided in the LPPe control parameters. If the procedure cannot be supported, an error reason is provided at the LPPe level and the transactions occurring at times 3-7 in FIG. 3B are not performed. The messages in steps 1 and 2 comprise a single LPP procedure (or transaction) according to the rules for LPP in 3GPP TS 36.355 (e.g., corresponds to steps 1 and 3 in FIG. 6A). Since the procedure establishes what assistance data is to be transferred in subsequent steps but does not actually transfer any assistance data, it may be referred to as a control transaction or control procedure.

When the first triggering or periodicity condition(s) occurs, the server 302 sends an unsolicited LPP ProvideAssistanceData message to the target 301 at time 3. The message contains the session ID S, an indication that the transaction is a periodic/triggered assistance data delivery, and LPPe data parameters containing the assistance data confirmed or defined at times 2 or 1. The message uses some available transaction ID T2 that may be different from T1. The LPPe control parameters and LPPe data parameters applicable to this procedure are distinguishable from one another. Inclusion of the same session ID S as in steps 1 and 2 tells the target 301 that the message relates to the assistance data transfer agreed in steps 1 and 2. Sending the message as part of a new procedure avoids violating LPP protocol rules.

At time 4, the server 302 may continue to send further LPP ProvideAssistanceData messages to the target 301. The messages contain the assistance data confirmed or redefined at time 2 when each additional triggering or periodicity condition(s) occurs. The messages also contain the same transaction ID T2 and session ID S as in step 3 and are thus seen by the target 301 as a continuation of the procedure associated with step 3.

If an error condition(s) occurs at the target 301 that causes the session to end, the target 301 sends an LPP Abort, at time 5, to the server 302 for transaction T2 that may optionally include LPP and/or LPPe error codes. Additionally, if the session ends, the transactions occurring at times 6 and 7 in FIG. 3B are then omitted. Error conditions that may induce an abort may include an attempt by either the target 301 or server 302 to update the assistance data transfer where the final control parameters provided by the server 302 are not acceptable to the target 301.

If an error condition occurs at the server 302 that causes the session to end without the delivery of further assistance data, the server 302 sends an LPP Abort to the target 301, at time 6, for the transaction T2 that may optionally include LPP and/or LPPe error codes. The transactions occurring at time 7 in FIG. 3B is then omitted. The sending of an LPP Abort message in step 5 or step 6 is allowed by LPP rules in 3GPP TS 36.355 and is thus consistent with LPP. Note that the LPP Abort message in step 5 or 6 carries the transaction ID T2 and is thus seen as part of (and the end of) the transaction associated with steps 3 and 4.

When the duration or other condition(s) for ending the assistance data transfer occur, a last LPP ProvideAssistanceData message is sent at time 7. The message indicates the end of transaction T2. In one aspect, terminating the transfer is used rather than aborting where possible, because additional termination information specific to the assistance data transfer may then be included. The complete transfer of assistance data in steps 3, 4, and 7 corresponds to a normal unsolicited LPP transfer of assistance data as shown in steps 2 and 3 of FIG. 6A. As these steps transfer assistance data but do not define or modify its content, they may be referred to as a data transaction or data procedure.

It may be seen from the above description, that the overall procedure in FIG. 3B is made of 2 separate smaller LPP procedures or transactions: a control transaction in steps 1 and 2 to define and agree the assistance data to be transferred, and a data transaction in steps 3, 4 and 7 to transfer the assistance data. These smaller procedures (or transactions) follow LPP rules in 3GPP TS 36.355 thus making the overall composite procedures also compliant with LPP.

Figure 3C:
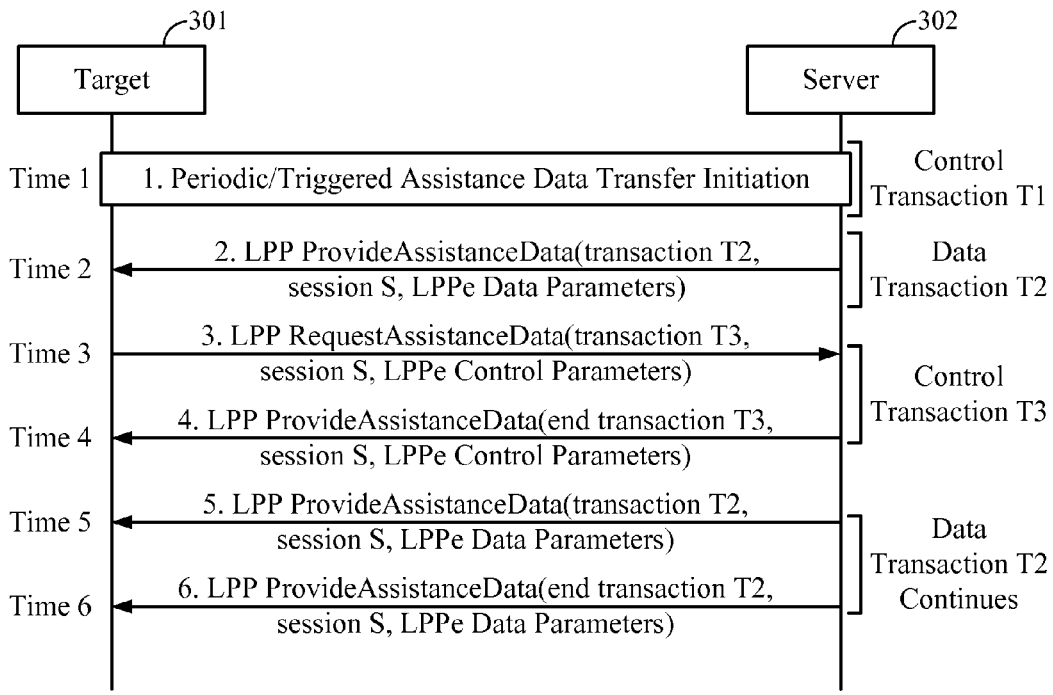
FIG. 3C is a call flow diagram illustrating an example target-initiated update for the ongoing data transfer session illustrated in FIG. 3A.

FIG. 3C is a call flow diagram illustrating how the target 301 may update an ongoing periodic/triggered assistance data transfer illustrated according to FIG. 3B. At time 1, an LPPe periodic/triggered assistance data transfer procedure with update is initiated using a control transaction or control procedure as in steps 1 and 2 of FIG. 3B. At time 2, the server 302 may send zero, one or more LPP ProvideAssistanceData messages to the target 301 containing the assistance data agreed at time 1 and using a transaction ID T2.

The target 301 may modify the assistance data before the delivery of assistance data has terminated. The target 301 sends, at time 3, an LPP RequestAssistanceData message to the server 302 using an available transaction ID T3. The ID T3 is different from T2 (if T2 has been started). The modification of assistance data may include updating the type of assistance data transferred, the triggering and periodicity conditions for transferring the assistance data, and/or the duration or conditions for terminating the transfer session. The request sent at time 3 contains the session ID S, an indication that this is an update request for a periodic/triggered assistance data transfer and LPPe control parameters. The LPPe control parameters identify any new type of assistance data being requested, any new triggering or periodicity condition(s) for sending the data, and any new duration or specific condition(s) for ending the assistance data transfer. The request also indicates whether the previous assistance data delivery shall continue or be aborted if the new request cannot be supported.

At time 4, the server 302 responds with an LPP ProvideAssistanceData message to the target 301. The message uses the transaction ID T3 and indicates the end of this transaction. The message contains the session ID S and an indication that this is a response to an update request. The message also contains LPPe control parameters indicating whether or not the update request at time 3 can be supported. If the request can be supported, the control parameters may explicitly confirm or redefine any new type of assistance data, any new triggering or periodicity parameters, and any new duration or other condition(s) for ending the assistance data transfer. Further characteristics of the assistance data to be delivered may also be provided in the message. If the request at time 3 cannot be supported, then, if requested at time 3, the earlier request agreed at time 1 shall continue via further repetitions of the transactions occurring at time 2 until it ends normally, is modified by a repetition of the transaction occurring at time 3, or is aborted. If requested otherwise at time 3, the earlier request (including transaction T2) shall be aborted at the server 302 without the sending of any further assistance data to the target 301. In either case, the transactions outlined for times 5 and 6 are then omitted. The procedure associated with steps 3 and 4 then ends (because an end of transaction indicator was included by the server 302 in step 4) and follows the LPP procedure rules in 3GPP TS 36.355 (e.g., corresponds to steps 1 and 3 in FIG. 6A). Since the procedure modifies the assistance data being transferred but does not actually transfer any assistance data, it may be referred to as a control transaction or control procedure.

If the server 302 can support the request at time 3, it ceases to support the request at time 1. Note that due to race conditions, one or more repetitions of the transaction occurring at time 2 may be perceived to occur by the target 301 following time 3 and prior to time 4. When the first updated triggering or periodicity condition(s) occurs following time 4, the server 302 sends an unsolicited LPP ProvideAssistanceData message, at time 5, to the target 301 containing the session ID S, an indication that this is periodic/triggered assistance data and LPPe data parameters. The LPPE data parameters contain the new assistance data confirmed or defined at time 4. The message continues to uses transaction ID T2 which avoids disturbing (e.g. violating) the LPP procedure for transfer of assistance data. Target 301 can determine when server 302 has changed the assistance data transfer according to when the LPP message in step 4 is received. Provided LPP messages are delivered to target 301 in the order sent by server 302 (which is a requirement for LPP in 3GPP TS 35.355), then all instances of step 2 will cease before step 4 occurs and step 5 will occur after step 4 has occurred. This avoids the need to include anything in the LPP message in step 5 to specifically indicate that changes to assistance data transfer have occurred which simplifies LPP and LPPe message content.

At time 6, the server 302 may continue to send further LPP ProvideAssistanceData messages to the target 301 containing the session ID S and LPPe data parameters containing the new assistance data confirmed or redefined at times 4 or 3 when each additional triggering or periodicity condition(s) occurs.

If the duration or other conditions for ending the assistance data transfer occur, the last LPP ProvideAssistanceData message transferred indicates the end of transaction T2. Prior to the end of the transaction, the target 301 may update the type of assistance data, triggering or periodicity condition(s) and/or duration or other conditions for terminating the transfer, by repeating the transaction occurring at times 3 and 4. The termination of the procedure in step 6 by including an end of transaction identifier follows LPP procedure rules—e.g. step 6 corresponds to step 3 in FIG. 6A. Moreover, the complete transfer of assistance data in steps 2, 5 and 6 corresponds to a normal unsolicited LPP transfer of assistance data as described in steps 2 and 3 of FIG. 6A. As these steps transfer assistance data but do not define or modify its content, they may be referred to as a data transaction or data procedure.

It may be seen from the above description, that the overall procedure in FIG. 3C is made of 3 separate smaller LPP procedures or transactions—a control transaction in step 1 to define and agree the assistance data to be transferred, another control transaction in steps 3 and 4 to enable the target 301 to modify the assistance data being transferred and a data transaction in steps 2, 5 and 6 to transfer the assistance data. These smaller procedures (or transactions) follow LPP rules in 3GPP TS 36.355 thus making the overall composite procedures also compliant with LPP.

Figure 3D:
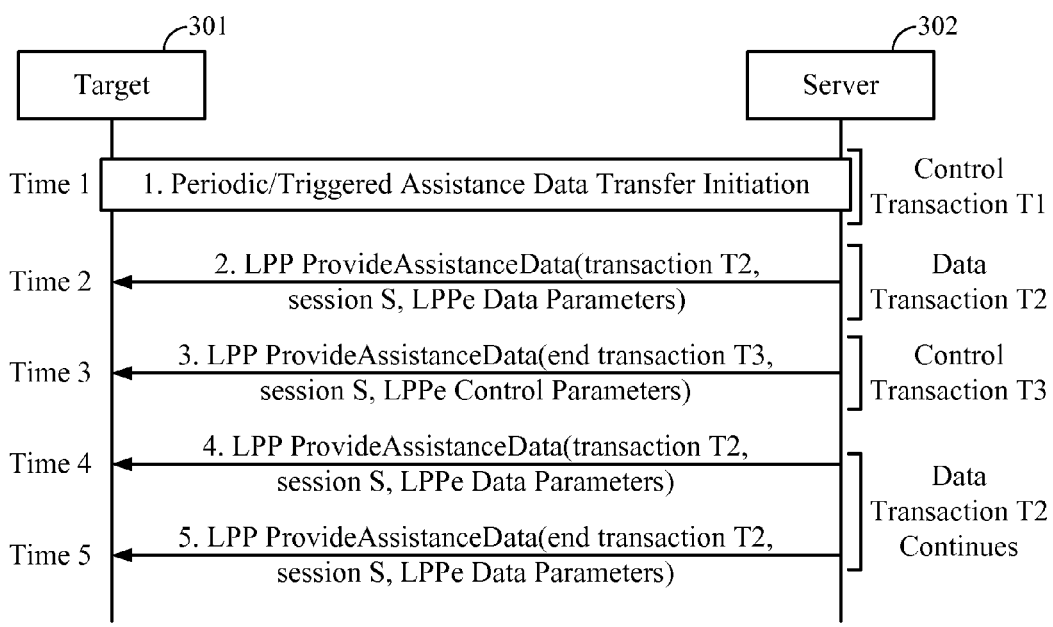
FIG. 3D is a call flow diagram illustrating an example server-initiated update for the ongoing data transfer session illustrated in FIG. 3A.

FIG. 3D is a call flow diagram illustrating how a server 302 may update an ongoing periodic/triggered assistance data transfer that was initiated according to FIG. 3B. At time 1, the periodic/triggered assistance data transfer session is initiated using a control transaction or control procedure as in steps 1 and 2 in FIG. 3B. At time 2, the server 302 may send zero, one or more LPP ProvideAssistanceData messages to the target 301 containing the assistance data agreed at time 1 and using a transaction ID T2.

The server 302 may indicate that it will modify the assistance data, before the delivery of assistance data has terminated by sending an unsolicited LPP ProvideAssistanceData message to the target 301 using some available transaction ID T3. The ID T3 shall be different from T2. Modification of the assistance data includes updating the type of assistance data to be transferred, the triggering and periodicity conditions for transferring the data, and/or the duration or conditions for terminating the transfer session. The message sent at time 3 contains the session ID S used in steps 1 and 2, an indication this is a server update for a periodic/triggered assistance data transfer and LPPe control parameters. The LPPe control parameters identify any new type of assistance data to be provided, any new triggering or periodicity conditions for sending it and any new duration or specific conditions for ending the assistance data transfer. After sending this message, the server 302 ceases to transfer assistance data according to the agreement at time 1. Inclusion of the session ID S tells the target 301 that the new request relates to the assistance data transfer of steps 1 and 2. Use of a transaction ID T3 that is different from T2 avoids an LPP protocol violation because the request in step 3 is seen by both target 301 and server 302 as belonging to a different procedure (different transaction) to that associated with step 2. Had transaction ID T3 been the same as T2, there would be a protocol violation and target 301 might abort the transfer. Step 3 also follows the LPP procedure rules in 3GPP TS 36.355 (e.g., corresponds to step 3 in FIG. 6A for a single unsolicited transfer of assistance data). But since the procedure modifies the assistance data actually being transferred but does not transfer any real assistance data, it may be referred to as a control transaction or control procedure.

At times 4 and 5, when the first updated triggering or periodicity condition(s) occur (as defined at time 3), the server 302 sends an unsolicited LPP ProvideAssistanceData message to the target 301 containing the session ID S, an indication that this is periodic/triggered assistance data and LPPe data parameters containing the new assistance data defined at time 3. The message continues to uses transaction ID T2 which avoids disturbing (e.g. violating) the LPP procedure for transfer of assistance data. The target 301 can determine when the server 302 has changed the assistance data transfer according to when the LPP message in step 4 is received. Provided LPP messages are delivered to the target 301 in the order sent by the server 302 (which is a requirement for LPP in 3GPP TS 36.355), then all instances of step 2 will cease before step 3 occurs and step 4 will occur after step 3 has occurred. This avoids the need to include anything in the LPP message in step 4 to specifically indicate that changes to assistance data transfer have occurred which simplifies LPP and LPPe message content.

The server 302 may continue to send further LPP ProvideAssistanceData messages to the target 301 containing the session ID S and LPPe data parameters containing the new assistance data defined at time 3 when each additional triggering or periodicity condition(s) occurs. If the duration or other conditions for ending the assistance data transfer occur, the last LPP ProvideAssistanceData message transferred indicates the end of transaction T2. The server 302 may update the type of assistance data, triggering or periodicity conditions and/or duration or other conditions for terminating the transfer, before ending the data transfer, by repeating the transaction occurring at time 3. The termination of the procedure in step 5 by including an end of transaction identifier follows LPP procedure rules (e.g., step 5 corresponds to step 3 in FIG. 6A). Moreover, the complete transfer of assistance data in steps 2, 4, and 5 corresponds to a normal unsolicited LPP transfer of assistance data as shown in steps 2 and 3 of FIG. 6A. As these steps transfer assistance data but do not define or modify its content, they may be referred to as a data transaction or data procedure.

It may be seen from the above description, that the overall procedure in FIG. 3D is made of 3 separate smaller LPP procedures or transactions: a control transaction in step 1 to define and agree the assistance data to be transferred, another control transaction in step 3 to enable the server 302 to modify the assistance data being transferred and a data transaction in steps 2, 4, and 5 to transfer the assistance data. These smaller procedures (or transactions) follow LPP rules in 3GPP TS 36.355 thus making the overall composite procedure also compliant with LPP.

Figure 4A:
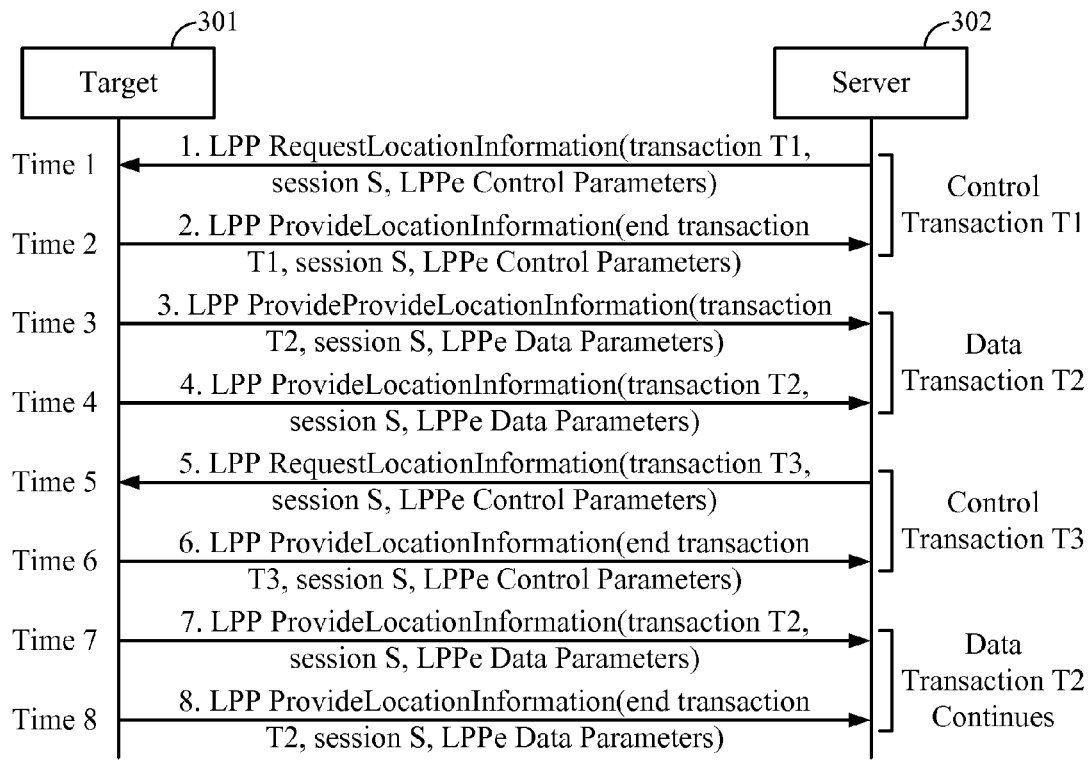
FIG. 4A is a call flow diagram illustrating an example location information data transfer procedure allowing for modification of location information while the data transfer session is ongoing.

Another aspect provides procedure to support delivery of periodic or triggered location information from a target to a server 302 where the server 302 is allowed to modify the type of location information (also referred to as location measurement information) being delivered and/or the periodic or triggering parameters during the delivery procedure. Location information may comprise measurements of GPS or GNSS satellites, measurements of signals transmitted by nearby base stations in the serving or other networks and location coordinates if computed by target 301 as well as other information. FIG. 4A illustrates a call flow diagram for an exemplary periodic/triggered location information transfer with server update. This procedure enables a server 302 to request a target 301 to send location information periodically at defined intervals or when specific triggering criteria are met. The procedure also allows a server 302 to modify the type of location information and/or the periodicity and triggering criteria while the delivery procedure is ongoing.

At time 1, the server 302 sends an LPP RequestLocationInformation message to the target 301 using an available transaction ID T1. The message may contain a session ID S that is different from any other LPPe session ID currently in use between the target 301 and server 302 for any other instance of the same type of procedure. The message may also contain LPPe control parameters identifying the type of location information being requested, the triggering or periodicity condition(s) for sending it and a duration or other specific condition(s) for ending the location information transfer.

At time 2, the target 301 responds with an LPP ProvideLocationInformation message to the server 302. The message uses the transaction ID T1 at time 1 and indicates the end of this transaction. The message contains the session ID S and LPPe control parameters indicating whether or not the request at time 1 can be supported. If the request can be supported, the control parameters may confirm or redefine the type of location information, the triggering or periodicity parameters and the duration or other condition(s) for ending the location information transfer. Further characteristics of the location information to be delivered may also be provided in the message. The message in step 2 ends the LPP procedure (also known as a transaction) started in step 1 and complies with the LPP rules in 3GPP TS 36.355 (e.g., corresponds to steps 1 and 3 in FIG. 6B). Since the procedure establishes what location information is to be transferred in subsequent steps but does not actually transfer any location information, it may be referred to as a control transaction or control procedure.

When the first triggering or periodicity condition(s) occurs, the target 301 sends an unsolicited LPP ProvideLocationInformation message, at time 3, to the server 302. The message contains the session ID S and LPPe data parameters containing the location information confirmed or defined at times 2 or 1. The message uses some available transaction ID T2 that may be different from T1. The LPPe control parameters and LPPe data parameters applicable to this procedure are distinguishable from one another. The session ID S confirms to the server 302 that the location information corresponds to that agreed in steps 1 and 2.

At time 4, the target 301 may continue to send additional LPP ProvideLocationInformation messages to the server 302 containing the location information confirmed at time 2 when each additional triggering or periodicity condition(s) occurs. If the duration or other conditions for ending the location information transfer occur, the last ProvideLocationInformation message transferred indicates the end of transaction T2. In this case, transactions occurring at times 5 to 8 in FIG. 4A are omitted. In this case the procedure (or transaction) ends according to the rules for LPP in 3GPP TS 36.355 (e.g., corresponds to steps 2 and 3 in FIG. 6B for unsolicited transfer of location information). In this case, since the procedure transfers location information but does not negotiate or modify its content, it may be referred to as data transaction or data procedure.

Before the delivery of location information has terminated, the server 302 may update the type of location information and/or the triggering and periodicity conditions and/or duration or conditions for termination by sending an LPP RequestLocationInformation message to the target 301, at time 5, using an available transaction ID T3. The ID T3 is different from T2. The message contains the session ID S and LPPe control parameters identifying any new type of location information being requested, any new triggering or periodicity conditions for sending it and any new duration or specific conditions for ending the location information transfer. The control parameters may also indicate whether the previous location information delivery shall continue (default) or be aborted if the new request cannot be supported. Inclusion of the session ID S tells the target 301 that the new request relates to the location information transfer of steps 1 to 4. Use of a transaction ID T3 that is different from T2 avoids an LPP protocol violation because the request in step 5 is seen by both server 302 and target 301 as belonging to a different procedure (different transaction) to that associated with steps 3 and 4. Had transaction ID T3 been the same as T2, there would be a protocol violation and target 301 might abort the transfer.

At time 6, the target 301 responds with an LPP ProvideLocationInformation message to the server 302. The message uses the transaction ID T3 and indicates the end of this transaction. The message contains LPPe control parameters indicating whether or not the modified request at time 5 can be supported. If the request can be supported, the control parameters may confirm or redefine any new type of location information, and new triggering or periodicity parameters and any new duration or other conditions for ending the location information transfer. Further characteristics of the location information to be delivered may also be provided. If the request at time 5 cannot be supported, then, unless requested otherwise at time 5, the earlier request at time 1 shall continue via further repetitions of the transactions occurring at time 4 until it ends normally or is modified by a repetition of the transaction occurring at time 5 or is aborted by the server 302. But if requested otherwise at time 5, the earlier request (including transaction T2) is be aborted at the target 301 without the sending of any further location information to the server 302. In either case, the transactions occurring at times 7 and 8 in FIG. 4A are then omitted. The procedure associated with steps 5 and 6 then ends (because an end of transaction indicator was included by the target 301 in step 6) and complies with LPP procedure rules in 3GPP TS 36.355 (e.g., corresponds to steps 1 and 3 in FIG. 6B). Since the procedure modifies the location information being transferred but does not actually transfer any location information, it may be referred to as a control transaction or control procedure.

If the target 301 can support the request at time 5, it ceases to support the request at time 1. Due to race conditions, one or more repetitions of the message occurring at time 4 may be perceived to occur by the server 302 following time 5 and prior to time 6. When the first updated triggering or periodicity condition(s) occurs following time 6, the target 301 sends an unsolicited LPP ProvideLocationInformation message to the server 302 containing the session ID S and LPPe data parameters containing the new location information confirmed or defined at times 6 or 5. The message continues to use transaction ID T2 which avoids disturbing (e.g., violating) the LPP procedure for transfer of location information. Server 302 can determine when target 301 has changed the location information transfer according to when the LPP message in step 6 is received. Provided LPP messages are delivered to server 302 in the order sent by target 301 (which is a requirement for LPP in 3GPP TS 35.355), then all instances of step 4 will cease before step 6 occurs and step 7 will occur after step 6 has occurred. This avoids the need to include anything in the LPP message in step 7 to specifically indicate that changes to location information transfer have occurred which simplifies LPP and LPPe message content.

The target 301 may continue to send further LPP ProvideLocationInformation messages to the server 302, at time 8, containing the session ID S and LPPe data parameters. The LLPe data parameters contain the new location information confirmed or redefined at times 6 or 5 when each additional triggering or periodicity condition(s) occurs. If the duration or other condition(s) for ending the location information transfer occurs, the last LPP ProvideLocationInformation message transferred indicates the end of transaction T2. Before the end of the transaction occurs, the server 302 may update the type of location information, triggering or periodicity conditions and/or duration or other condition(s) for terminating the transfer, and the transactions occurring at times 5 and 6 are repeated. The termination of the procedure in step 8 by including an end of transaction identifier follows LPP procedure rules (e.g., step 8 corresponds to step 3 in FIG. 6B). Moreover, the complete transfer of location information in steps 3, 4, 7 and 8 corresponds to a normal unsolicited LPP transfer of location information as shown in steps 2 and 3 of FIG. 6B. As these steps transfer location information but do not define or modify its content, they may be referred to as a data transaction or data procedure.

It may be seen from the above description, that the overall procedure in FIG. 4A is made of 3 separate smaller LPP procedures or transactions—a control transaction in steps 1 and 2 to define and agree the location information to be transferred, another control transaction in steps 5 and 6 to modify the location information to be transferred and a data transaction in steps 3, 4, 7 and 8 to transfer the location information. These smaller procedures (or transactions) follow LPP rules in 3GPP TS 36.355 thus making the overall composite procedure also compliant with LPP.

Figure 4B:
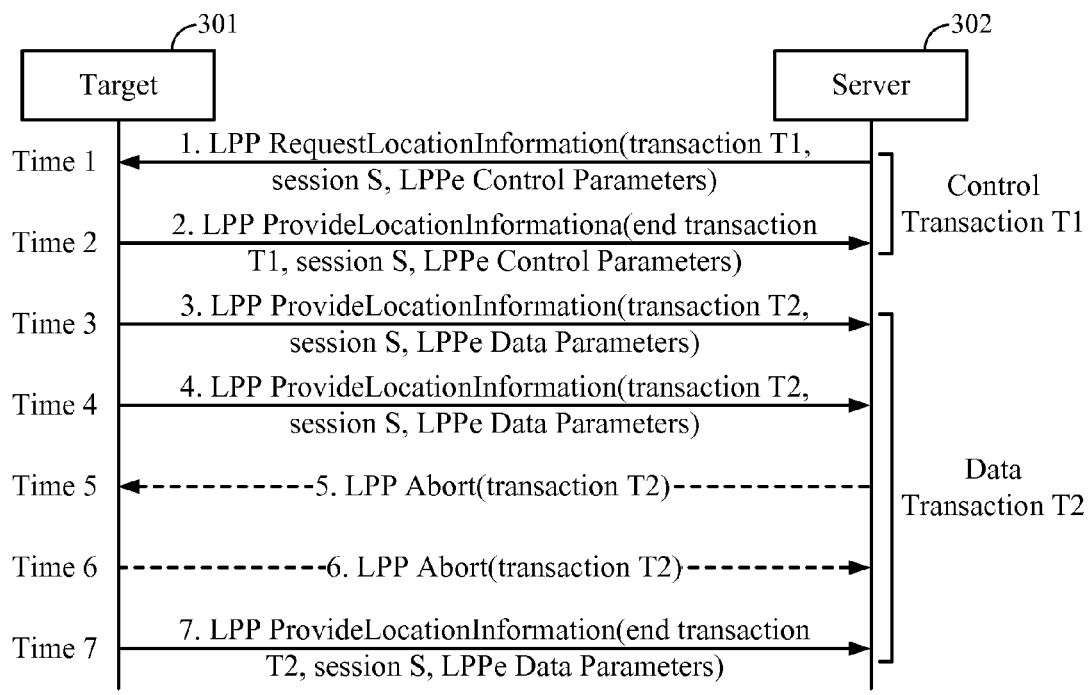
FIG. 4B is a call flow diagram illustrating example initiation and termination of the session illustrated in FIG. 4A.

FIG. 4B is a call flow diagram illustrating exemplary initiation and termination of the location information transfer session illustrated in FIG. 4A. At time 1, the server 302 sends an LPP RequestLocationInformation message to the target 301 using some available transaction ID T1. The message contains a session ID S (different from any other LPPe session ID currently in use between the target 301 and server 302 for any other instance of the same type of procedure), an indication that this is an initial request for a Periodic/Triggered Location Information transfer and LPPe control parameters. The LPPe control parameters identify the type of location information being requested, the triggering or periodicity conditions for sending it and either a duration or other specific condition(s) for ending the location information transfer.

At time 2, the target 301 responds with an LPP ProvideLocationInformation message to the server 302. The message uses the transaction ID T1 at time 1 and indicates the end of this transaction. The message contains the session ID S, an indication that this is a response to an initial request, and LPPe control parameters indicating whether or not the request at time 1 can be supported. If the request can be supported, the control parameters may explicitly confirm or redefine the type of location information, the triggering or periodicity parameters and the duration or other conditions for ending the location information transfer. Further characteristics of the location information to be delivered may also be provided in the message. If the procedure cannot be supported, an error reason is provided at the LPPe level and remaining steps are then not performed. The messages in steps 1 and 2 comprise a single LPP procedure (or transaction) according to the rules for LPP in 3GPP TS 36.355 (e.g., correspond to steps 1 and 3 in FIG. 6B). Since the procedure establishes what location information is to be transferred in subsequent steps but does not actually transfer any location information, it may be referred to as a control transaction or control procedure.

At time 3, when the first triggering or periodicity condition(s) occurs, the target 301 sends an unsolicited LPP ProvideLocationInformation message to the server 302 containing the session ID S, an indication that this is a periodic/triggered location information delivery, and LPPe data parameters. LPPe data parameters contain the location information confirmed or defined at times 2 or 1. The message uses some available transaction ID T2 that may be different from T1. Inclusion of the same session ID S as in steps 1 and 2 tells the server 302 that the message relates to the location information transfer agreed in steps 1 and 2. Sending the message as part of a new procedure avoids violating LPP protocol rules.

At time 4, the target 301 may continue to send further LPP ProvideLocationInformation message to the server 302 containing the location information confirmed or redefined at times 2 or 1 when each additional triggering or periodicity condition(s) occurs. The messages also contain the same transaction ID T2 and session ID S as in step 3 and are thus seen by the server 302 as a continuation of the procedure associated with step 3.

If an error condition(s) occurs at the server 302 that causes the session to end, the server 302 sends an LPP Abort to the target 301, at time 5, for transaction T2 that may optionally include LPP and/or LPPe error codes. Remaining steps occurring at times 6-7 are then omitted. Error conditions that may induce an abort include an attempt by either the server 302 or target 301 to update the location information transfer, where the final control parameters provided by the target 301 are not acceptable to the server 302.

If an error condition(s) occurs at the target 301 that cause the session to end without the delivery of further location information, the target 301, at time 6, sends an LPP Abort to the server 302 for transaction T2 that may optionally include LPP and/or LPPe error codes. The remaining step at time 7 is then omitted. The sending of an LPP Abort message in step 5 or step 6 is allowed by LPP rules in 3GPP TS 36.355 and is thus consistent with LPP. Note that the LPP Abort message in steps 5 and 6 carries the transaction ID T2 and is thus seen as part of (and the end of) the transaction associated with steps 3 and 4.

When the duration or other conditions for ending the location information transfer occur, the last LPP ProvideLocationInformation message transferred, at time 7, indicates the end of transaction T2. Terminating the transfer allows additional termination information specific to the location information transfer may be included, as compared to aborting the transfer. The complete transfer of location information in steps 3, 4, and 7 corresponds to a normal unsolicited LPP transfer of location information as shown in steps 2 and 3 of FIG. 6B. As these steps transfer location information but do not define or modify its content, they may be referred to as a data transaction or data procedure.

It may be seen from the above description, that the overall procedure in FIG. 4B is made of 2 separate smaller LPP procedures or transactions: a control transaction in steps 1 and 2 to define and agree the location information to be transferred, and a data transaction in steps 3, 4 and 7 to transfer the location information. These smaller procedures (or transactions) follow LPP rules in 3GPP TS 36.355 thus making the overall composite procedures also compliant with LPP.

Figure 4C:
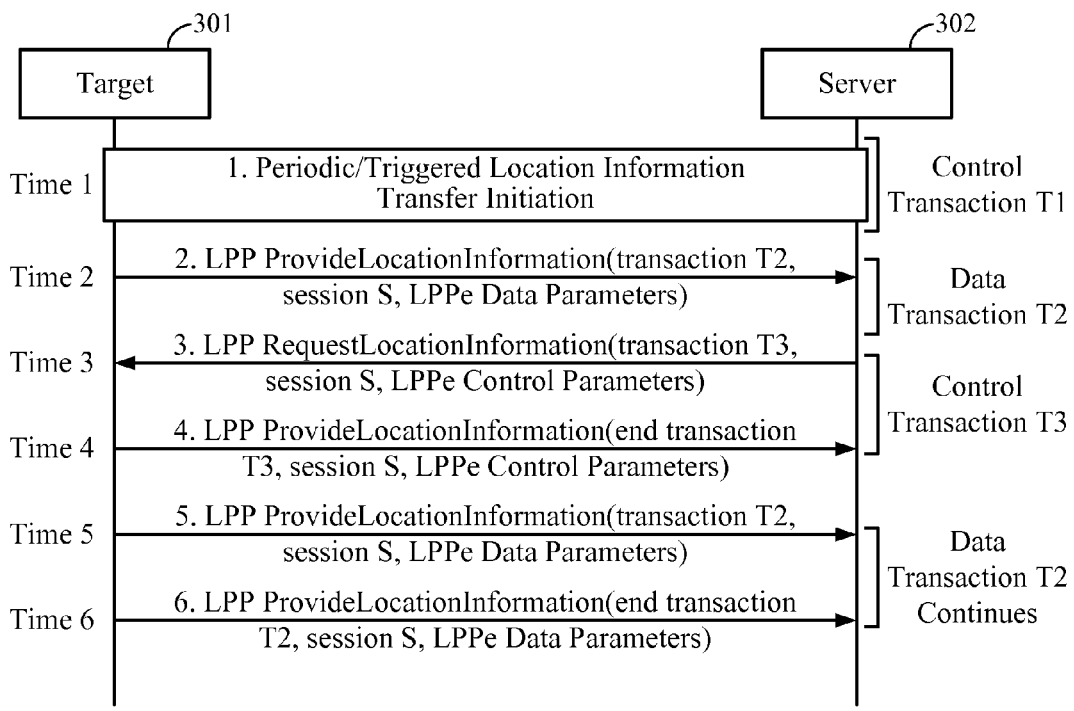
FIG. 4C is a call flow diagram illustrating an example server-initiated update for the ongoing data transfer session illustrated in FIG. 4A.

FIG. 4C is a call flow diagram illustrating how the server 302 may update an ongoing periodic/triggered location information transfer that was started according to FIG. 4B. At time 1, the periodic/triggered location information transfer procedure is initiated using a control transaction or control procedure as in steps 1 and 2 of FIG. 4B. At time 2, the target 301 may send zero, one or more LPP ProvideLocationInformation messages to the server 302 containing the location information agreed at time 1 and using a transaction ID T2.

At time 3, the server 302 may modify the location information. Modification of the location information includes updating the type of location information, the triggering and periodicity conditions for transferring location information, and/or duration or condition(s) for termination. The server 302 sends an LPP RequestLocationInformation message to the target 301 using some available transaction ID T3. The ID T3 is different from T2 (if T2 has been started). The message contains the session ID S, an indication that this is an update request for a periodic/triggered location information transfer and LPPe control parameters. The LPPe control parameters identify any new type of location information being requested, any new triggering or periodicity conditions for sending it, and any new duration or specific condition(s) for ending the location information transfer. The control parameters may also indicate whether the previous location information delivery will continue or be aborted if the new request cannot be supported. Inclusion of the session ID S tells the target 301 that the new request relates to the location information transfer of steps 1 and 2. Use of a transaction ID T3 that is different from T2 avoids an LPP protocol violation because the request in step 3 is seen by both the server 302 and target 301 as belonging to a different procedure (different transaction) to that associated with step 2. Had transaction ID T3 been the same as T2, there would be a protocol violation and server 302 might abort the transfer.

At time 4, the target 301 responds with an LPP ProvideLocationInformation message to the server 302. The message uses the transaction ID T3 and indicates the end of this transaction. The message contains the session ID S and an indication that this is a response to an update request. The message also contains LPPe control parameters indicating whether or not the update request at time 3 can be supported. If the request can be supported, the control parameters may explicitly confirm or redefine any new type of location information, any new triggering or periodicity parameters and any new duration or other conditions for ending the location information transfer. Further characteristics of the location information to be delivered may also be provided in the message. If the request at time 3 cannot be supported, then, if requested at time 3, the earlier request at time 1 shall continue via further repetitions of the transactions at time 2 until it ends normally or is modified by a repetition of the transaction at time 3 or is aborted. But if requested otherwise at time 3, the earlier request (including transaction T2) shall be aborted at the target 301 without the sending of any further location information to the server 302. In either case, the steps occurring at times 5 and 6 are then omitted. The procedure associated with steps 3 and 4 then ends (because an end of transaction indicator was included by the target 301 in step 4) and follows the LPP procedure rules in 3GPP TS 36.355 (e.g., corresponds to steps 1 and 3 in FIG. 6B). Since the procedure modifies the location information being transferred but does not actually transfer any location information, it may be referred to as a control transaction or control procedure.

If the target 301 can support the request at time 3, then following time 4, the target 301 ceases to support the request occurring in the transaction at time 1. Due to race conditions, one or more repetitions of the step occurring at time 2 may be perceived to occur by the server 302 following time 3 and prior to time 4. When the first updated triggering or periodicity condition(s) occurs following time 4, the target 301 sends an unsolicited LPP ProvideLocationInformation message to the server 302, at time 5, containing the session ID S, an indication that this is periodic/triggered location information and LPPe data parameters. The LPPe data parameters contain the new location information confirmed or defined at times 4 or 3. The message continues to use transaction ID T2 which avoids disturbing (e.g. violating) the LPP procedure for transfer of location information. Server 302 can determine when target 301 has changed the location information transfer according to when the LPP message in step 4 is received. Provided LPP messages are delivered to server 302 in the order sent by target 301 (which is a requirement for LPP in 3GPP TS 35.355), then all instances of step 2 will cease before step 4 occurs and step 5 will occur after step 4 has occurred. This avoids the need to include anything in the LPP message in step 5 to specifically indicate that changes to location information transfer have occurred which simplifies LPP and LPPe message content.

At time 6, the target 301 may continue to send further LPP ProvideLocationInformation messages to the server 302 containing the session ID S and LPPe data parameters containing the new location information confirmed or redefined at times 4 or 3 when each additional triggering or periodicity conditions occurs. If the duration or other condition(s) for ending the location information transfer occur, the last LPP ProvideLocationInformation message transferred indicates the end of transaction T2. If, before this occurs, the server 302 wants to update the type of location information, triggering or periodicity conditions and/or duration or other condition(s) for terminating the transfer, the steps occurring at times 3 and 4 are repeated. The termination of the procedure in step 6 by including an end of transaction identifier follows LPP procedure rules (e.g., step 6 corresponds to step 3 in FIG. 6B). Moreover, the complete transfer of location information in steps 2, 5 and 6 corresponds to a normal unsolicited LPP transfer of assistance data as shown in steps 2 and 3 of FIG. 6B. As these steps transfer location information but do not define or modify its content, they may be referred to as a data transaction or data procedure.

It may be seen from the above description, that the overall procedure in FIG. 4C is made of 3 separate smaller LPP procedures or transactions—a control transaction in step 1 to define and agree the location information to be transferred, another control transaction in steps 3 and 4 to enable the server 302 to modify the location information being transferred and a data transaction in steps 2, 5 and 6 to transfer the location information. These smaller procedures (or transactions) follow LPP rules in 3GPP TS 36.355 thus making the overall composite procedure also compliant with LPP.

Figure 4D:
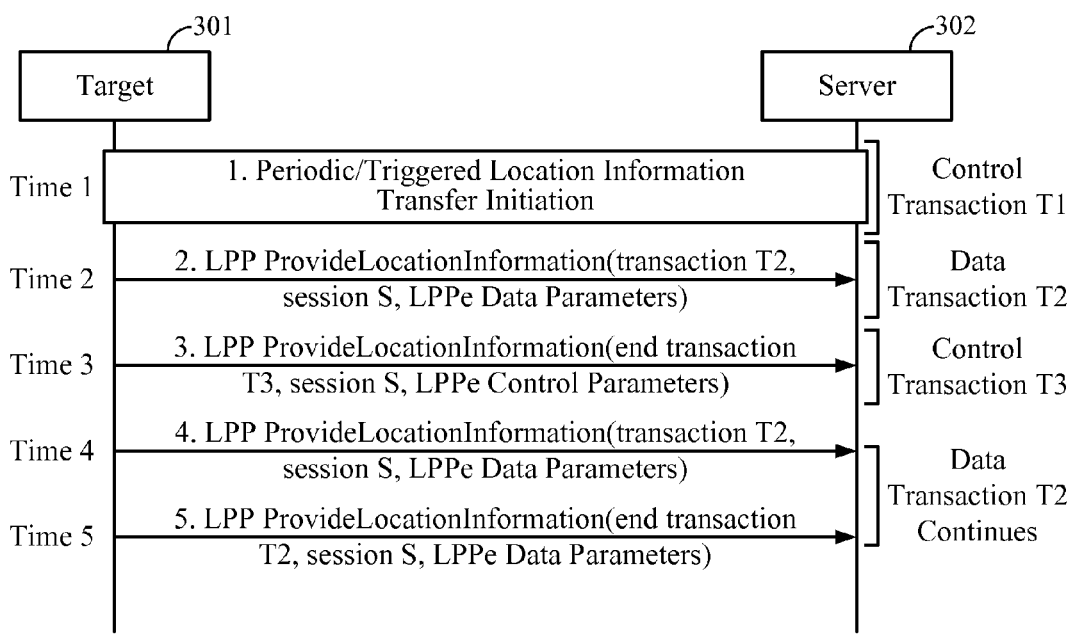
FIG. 4D is a call flow diagram illustrating an example target-initiated update for the ongoing data transfer session illustrated in FIG. 4A.

FIG. 4D is a call flow diagram illustrating how the target 301 may update an ongoing periodic/triggered location information transfer that was started according to FIG. 4B.

At time 1, the procedure is initiated using a control transaction or control procedure as in steps 1 and 2 in FIG. 4B. At time 2, the target 301 may send zero, one or more LPP ProvideLocationInformation message to the server 302 containing the location information agreed at time 1 and using a transaction ID T2.

At time 3, before the delivery of location information has terminated, the target 301 may update the type of location information, the triggering and periodicity conditions, and/or duration or condition(s) for termination. The target 301 sends an unsolicited LPP ProvideLocationInformation message to the server 302 using some available transaction ID T3. The ID T3 is different from T2 (if T2 has been started). The message contains the session ID S used in steps 1 and 2, an indication that this is a target update for a periodic/triggered location information transfer and LPPe control parameters. The LPPe control parameters identify any new type of location information to be provided, any new triggering or periodicity conditions for sending it and any new duration or specific condition(s) for ending the location information transfer. After sending this message, the target 301 ceases to transfer location information according to that of time 2. Inclusion of the session ID S tells the server 302 that the new request relates to the location information transfer of steps 1 and 2. Use of a transaction ID T3 that is different from T2 avoids an LPP protocol violation because the request in step 3 is seen by both server 302 and target 301 as belonging to a different procedure (different transaction) to that associated with step 2. Had transaction ID T3 been the same as T2, there would be a protocol violation and server 302 might abort the transfer. Step 3 also follows the LPP procedure rules in 3GPP TS 36.355 (e.g., corresponds to step 3 in FIG. 6B for a single unsolicited transfer of location information). But since the procedure modifies the location information being transferred but does not transfer any real location information, it may be referred to as a control transaction or control procedure.

When the first updated triggering or periodicity conditions occurs (as defined at time 3), the target 301 sends an unsolicited LPP ProvideLocationInformation message, at time 4, to the server 302 containing the session ID S, an indication that this is periodic/triggered location information and LPPe data parameters. The LPPe data parameters contain the new location information defined at time 3. The message continues to uses transaction ID T2 which avoids disturbing (e.g. violating) the LPP procedure for transfer of location information. Server 302 can determine when target 301 has changed the location information transfer according to when the LPP message in step 4 is received. Provided LPP messages are delivered to server 302 in the order sent by target 301 (which is a requirement for LPP in 3GPP TS 36.355), then all instances of step 2 will cease before step 3 occurs and step 4 will occur after step 3 has occurred. This avoids the need to include anything in the LPP message in step 4 to specifically indicate that changes to location information transfer have occurred which simplifies LPP and LPPe message content.

At time 5, the target 301 may continue to send further LPP ProvideLocationInformation messages to the server 302 containing the session ID S and LPPe data parameters containing the new location information defined at time 3 when each additional triggering or periodicity condition(s) occurs. If the duration or other condition(s) for ending the location information transfer occurs, the last LPP ProvideLocationInformation message transferred indicates the end of transaction T2. Before the transaction ends, the target 301 may update the type of location information, triggering or periodicity conditions and/or duration or other condition(s) for terminating the transfer, by repeating the transaction of time 3. The termination of the procedure in step 5 by including an end of transaction identifier follows LPP procedure rules (e.g., step 5 corresponds to step 3 in FIG. 6B). Moreover, the complete transfer of location information in steps 2, 4 and 5 corresponds to a normal unsolicited LPP transfer of location information as shown in steps 2 and 3 of FIG. 6B. As these steps transfer location information but do not define or modify its content, they may be referred to as a data transaction or data procedure.

It may be seen from the above description, that the overall procedure in FIG. 4D is made of 3 separate smaller LPP procedures or transactions: a control transaction in step 1 to define and agree the location information to be transferred, another control transaction in step 3 to enable the target 301 to modify the location information being transferred and a data transaction in steps 2, 4 and 5 to transfer the location information. These smaller procedures (or transactions) follow LPP rules in 3GPP TS 36.355 thus making the overall composite procedure also compliant with LPP.

Figure 5A:
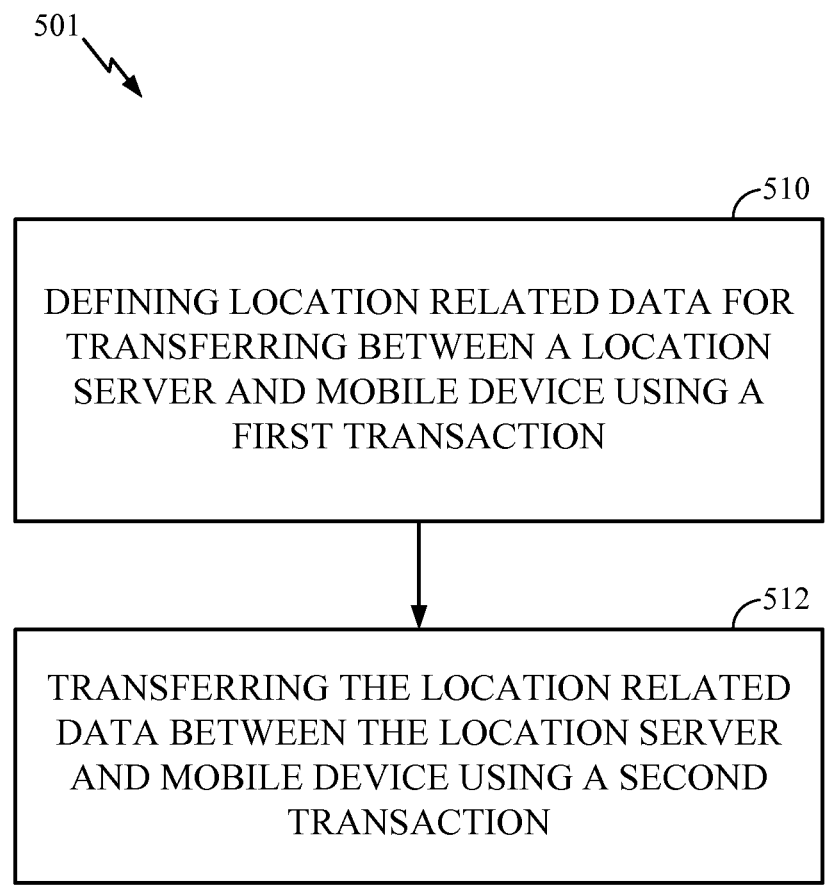
FIGS. 5A and 5B are block diagrams illustrating an example methods allowing for the modification of location related data during an ongoing data transfer session between a location server and a mobile device.

FIG. 5A illustrates an exemplary method 501 for determining a location of a target, such as a mobile device. In block 510, location related data for transferring between a location server and the mobile device is defined using a first transaction. In block, 512, location related data is transferred between the location server and the mobile device using a second transaction.

Figure 5B:
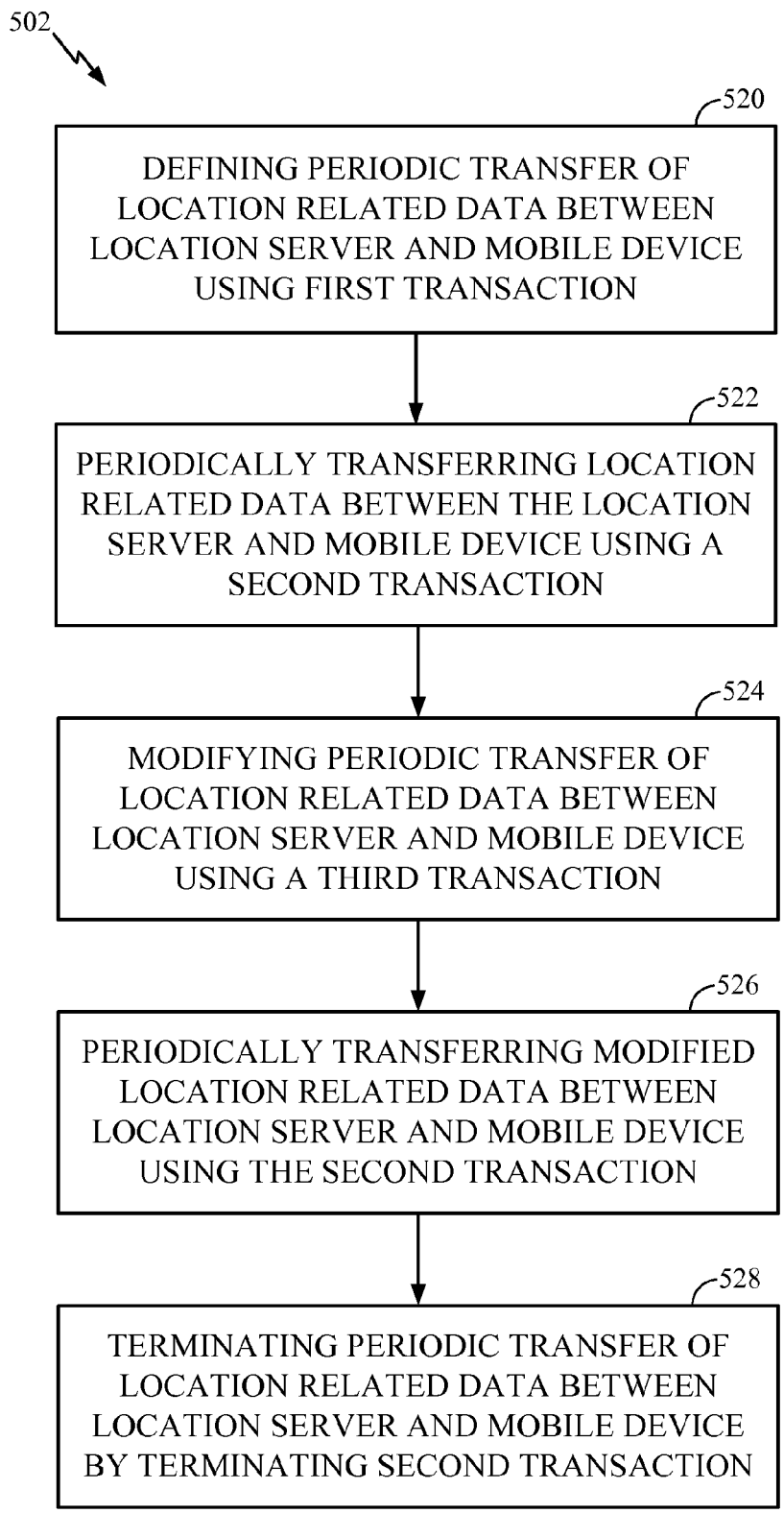

FIG. 5B illustrates an exemplary method 502 for determining a location of a target, such as a mobile device. In block 520, location related data for transferring between a location server and the mobile device is defined using a first transaction. In block, 522, location related data is transferred between the location server and the mobile device using a second transaction. In block 524, the periodic transfer of location related data between the location server and the mobile device is modified using a third transaction. In block 526, the modified location related data is periodically transferred between the location server and the mobile device using the second transaction. In block 528, the periodic transfer of location related data between the location server and the mobile device is terminated by terminating the second transaction.

Figure 7:
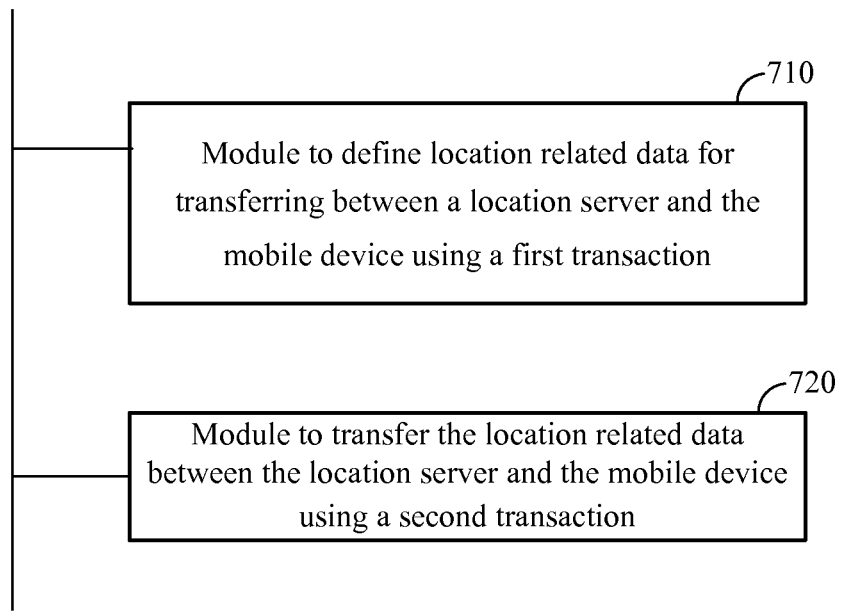
FIG. 7 is a block diagram illustrating components allowing for the modification of location-related data during an ongoing data transfer session between a location server and a mobile device.

FIG. 7 shows a block diagram of an apparatus, such as the mobile device 16, target, or location server 26. The apparatus includes a module 710 for defining location related data for transferring between a location server and the mobile device using a first transaction. The apparatus also includes a module 720 for transferring the location related data between the location server and the mobile device using a second transaction. The modules in FIG. 7 may be processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine or computer readable medium tangibly embodying instructions may be used in implementing the methodologies described herein. For example, software code may be stored in a memory and executed by a processor. When executed by the processor, the executing software code generates the operational environment that implements the various methodologies and functionalities of the different aspects of the teachings presented herein. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

The machine- or computer-readable medium that stores the software code defining the methodologies and functions described herein includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. As used herein, disk and/or disc includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. Although the communication apparatus may not store all of the instructions and/or data on a computer readable medium.

The disclosure may be implemented in conjunction with Wi-Fi/WLAN or other wireless networks. In addition to Wi-Fi/WLAN signals, a wireless/mobile station may also receive signals from satellites, which may be from a Global Positioning System (GPS), Galileo, GLONASS, NAVSTAR, QZSS, a system that uses satellites from a combination of these systems, or any SPS developed in the future, each referred to generally herein as a Satellite Positioning System (SPS) or GNSS (Global Navigation Satellite System). The disclosure may also be implemented in conjunction with pseudolites or a combination of systems that includes pseudolites. The disclosure may also be implemented in conjunction with femto cells or a combination of systems that includes femto cells.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN, and/or WPAN.

Although the preceding description was primarily with respect to GPS, the method and apparatus described herein may be used with various global satellite positioning systems (SPS). A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass, or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global navigation satellite systems, regional navigation satellite systems, and/or augmentation systems, and SPS signals may include SPS, SPS-like, and/or other signals associated with such one or more SPS.

The methodologies may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and similar devices. The term "SPS signals," as used herein, is intended to include SPS-like signals from pseudolites or equivalents of pseudolites.

As used within the disclosure, a mobile device refers to a device such as a cellular or other wireless communication device, personal communication system (PCS) device, personal navigation device (PND), personal information manager (PIM), personal digital assistant (PDA), laptop, tablet or other suitable mobile station device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, WiFi, or other networks, and regardless of whether satellite signal reception, assistance reception, and/or position-related processing occurs at the device, at a server, or at another device associated with the network. Any operable combination of the above are also considered a "mobile device."

This disclosure includes example embodiments; however, other implementations can be used. Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of determining a location of a mobile device, comprising;
   identifying a confirmed type of location related data for transferring between a location server and the mobile device using a first transaction, wherein the first transaction includes:
      a message identifying a requested type of location related data, and
      a response to the message, identifying the confirmed type of location related data in a 3GPP LTE Positioning Protocol (LPP) Extensions message, wherein information carried in the LPP Extensions (LPPe) message is used to support transfer of assistance data and location information according to defined LPP and LPPe procedures;
   wherein the message and the response both include:
      a first transaction identifier, and
      a session identifier; and
   transferring location related data of the confirmed type between the location server and the mobile device using a second transaction, wherein the second transaction includes:
      a second transaction identifier, and
      the same session identifier as the first transaction;
   wherein the first and second transactions are LPP transactions communicated in accordance with LPP.

2. The method of claim 1, further comprising modifying at least one of the type of location related data, periodicity for transferring data, triggering criteria, or termination condition using a third transaction, wherein the third transaction is an LPP transaction communicated in accordance with 3GPP LTE Positioning Protocol (LPP).

3. The method of claim 1, in which the location related data is assistance data transferred from the location server to the mobile device.

4. The method of claim 1, in which the location related data is location information transferred from the mobile device to the location server.

5. The method of claim 2, in which modifying comprises sending an update request from the mobile device to the location server.

6. The method of claim 2, in which modifying comprises sending an update request from the location server to the mobile device.

7. The method of claim 1, in which the first and second transaction identifiers are distinct LPP transaction IDs.

8. The method of claim 2, in which the third transaction uses an LPP transaction ID different from an LPP transaction ID used by the second transaction.

9. An apparatus for wireless communication, comprising:
   a memory; and
   at least one processor coupled to the memory, the at least one processor being configured to:
      identify a confirmed type of location related data for transferring between a location server and a mobile device using a first transaction, wherein the first transaction includes:
         a message identifying a requested type of location related data, and
         a response to the message, identifying the confirmed type of location related data in a 3GPP LTE Positioning Protocol (LPP) Extensions message, wherein information carried in the LPP Extensions (LPPe) message is used to support transfer of assistance data and location information according to defined LPP and LPPe procedures;
      wherein the message and the response both include:
         a first transaction identifier, and
         a session identifier; and
      transfer location related data of the confirmed type between the location server and the mobile device using a second transaction, wherein the second transaction includes:
         a second transaction identifier, and
         the same session identifier as the first transaction;
      wherein the first and second transactions are LPP transactions communicated in accordance with LPP.

10. The apparatus of claim 9, in which the at least one processor is further configured to modify at least one of the type of location related data, periodicity for transferring data, triggering criteria and termination condition using a third transaction, wherein the third transaction is an LPP transaction communicated in accordance with 3GPP LTE Positioning Protocol (LPP).

11. The apparatus of claim 9, in which the location related data is assistance data transferred from the location server to the mobile device.

12. The apparatus of claim 9, in which the location related data is location information transferred from the mobile device to the location server.

13. The apparatus of claim 10, in which the at least one processor configured to send an update request from the mobile device to the location server.

14. The apparatus of claim 10, in which the at least one processor configured to send an update request from the location server to the mobile device.

15. The apparatus of claim 9, in which the first and second transaction identifiers are distinct LPP transaction IDs.

16. The apparatus of claim 10, in which the third transaction uses an LPP transaction ID different from the second transaction identifier.

17. A computer program product for wireless communication in a wireless network, comprising:
- a computer-readable medium having non-transitory program code recorded thereon, the program code comprising:
  - program code to identify a confirmed type of location related data for transferring between a location server and a mobile device using a first transaction, wherein the first transaction includes:
    - a message identifying a requested type of location related data, and
    - a response to the message, identifying the confirmed type of location related data in a 3GPP LTE Positioning Protocol (LPP) Extensions message, wherein information carried in the LPP Extensions (LPPe) message is used to support transfer of assistance data and location information according to defined LPP and LPPe procedures;
  - wherein the message and the response both include:
    - a first transaction identifier, and
    - a session identifier; and
  - program code to transfer location related data of the confirmed type between the location server and the mobile device using a second transaction, wherein the second transaction includes:
    - a second transaction identifier, and
    - the same session identifier as the first transaction;
    - wherein the first and second transactions are LPP transactions communicated in accordance with LPP.

18. An apparatus for wireless communication, comprising:
- means for identifying a confirmed type of location related data for transferring between a location server and a mobile device using a first transaction, wherein the first transaction includes:
  - a message identifying a requested type of location related data, and
  - a response to the message, identifying the confirmed type of location related data in a 3GPP LTE Positioning Protocol (LPP) Extensions message, wherein information carried in the LPP Extensions (LPPe) message is used to support transfer of assistance data and location information according to defined LPP and LPPe procedures;
- wherein the message and the response both include:
  - a first transaction identifier, and
  - a session identifier; and
- means for transferring location related data of the confirmed type between the location server and the mobile device using a second transaction, wherein the second transaction includes:
  - a second transaction identifier, and
  - the same session identifier as the first transaction;
- wherein the first and second transactions are LPP transactions communicated in accordance with LPP.

19. The method of claim 1, wherein the confirmed type of location related data is the same as the requested type of location related data.

* * * * *